US005586314A

United States Patent [19]
Hill et al.

[11] Patent Number: 5,586,314

[45] Date of Patent: Dec. 17, 1996

[54] GRAPHIC INFORMATION MODELING AND ICON-BASED INTERMEDIATE TEXT LANGUAGE GENERATION

[75] Inventors: Thomas L. Hill, Dallas; Larry L. Gabrielsen, deceased, late of Garland, both of Tex., by Cheryl Gabrielsen, heir

[73] Assignee: Electronic Data Systems Corporation, Plano, Tex.

[21] Appl. No.: 392,030

[22] Filed: Feb. 22, 1995

(Under 37 CFR 1.47)

Related U.S. Application Data

[63] Continuation of Ser. No. 153,265, Nov. 15, 1993, abandoned, which is a continuation of Ser. No. 517,840, May 2, 1990, abandoned.

[51] Int. Cl.$^6$ .................................................. G06F 17/30
[52] U.S. Cl. ................................. 395/604; 364/DIG. 1; 364/280.4; 364/282.1; 364/286; 395/610
[58] Field of Search .................................. 395/600, 161, 395/919, 600

[56] References Cited

U.S. PATENT DOCUMENTS

| | | | |
|---|---|---|---|
| 4,536,840 | 8/1985 | Borta | 395/700 |
| 4,635,208 | 1/1987 | Coleby et al. | 364/491 |
| 4,688,195 | 8/1987 | Thompson et al. | 395/12 |
| 4,752,889 | 6/1988 | Rappaport et al. | 395/12 |
| 4,829,423 | 5/1989 | Tennant et al. | 364/419.08 |
| 4,860,204 | 8/1989 | Gendron et al. | 395/140 |
| 4,866,638 | 9/1989 | Cosentino et al. | 395/159 |
| 4,905,163 | 2/1990 | Garber et al. | 395/63 |
| 4,914,590 | 4/1990 | Loatman et al. | 364/419.08 |
| 5,014,220 | 5/1991 | McMann et al. | 395/50 |
| 5,175,800 | 12/1992 | Galis et al. | 395/51 |
| 5,187,788 | 2/1993 | Warmelsteiin | 395/700 |
| 5,206,950 | 4/1993 | Geary et al. | 395/600 |
| 5,247,651 | 9/1993 | Clarisse | 395/500 |
| 5,301,270 | 4/1994 | Steinberg et al. | 395/161 |
| 5,301,336 | 4/1994 | Kodosky et al. | 395/800 |
| 5,317,688 | 5/1994 | Watson et al. | 395/161 |
| 5,335,323 | 8/1994 | Kolnick | 395/164 |

OTHER PUBLICATIONS

Chen, "The Entity–Relationship Model—Toward A Unified View of Data," ACM Transactions On Database Systems, vol. 1, No. 1, Mar. 1976, pp. 9–36.

Codd, "Relational Database: A Practical Foundation For Productivity," Communications of the ACM, vol. 25, No. 2, Feb. 1982, pp. 109–117.

Grochow, "Application Generators: An Introduction", National Computer Conference, 1982, pp. 389, 391–392.

Cardenas and Grafton, "Challenges and Requirements for New Application Generators, National Computer Conference", 1982, pp. 341, 343–349.

Goodman, "Application Generators at IBM," National Computer Conference, 1982, pp. 359, 361–362.

Chang et al, "A Visual Language Compilier", IEEE Transactions on Software Engineering, vol. 15 No. 5 May 1989, pp. 506–525.

Crimi et al, "An Intelligent Iconic System to generate and to interpret Visual Languages", 1989 IEEE Workshop on Visual Languages, 4–6 Oct. 1989, pp. 144–149.

Tortora et al, "A Model for the Specification and Interpretation of Visual Languages", IEEE Workshop on Visual Languages, 10–12 Oct. 1988, pp. 52–60.

*Primary Examiner*—Thomas G. Black
*Assistant Examiner*—Wayne Amsbury
*Attorney, Agent, or Firm*—L. Joy Griebenow

[57] ABSTRACT

The apparatus used to develop software to operate a multiple element processor-based system, is comprised of an icon-based language that enables users to input data defining interrelationships among the subsystem elements. A data modeling apparatus is used to define a set of logical attributes and a set of physical attributes of said subsystem elements. The input data is then translated into a set of program instructions, using a sequential program language, representative of software to operate said processor-based system.

24 Claims, 1 Drawing Sheet

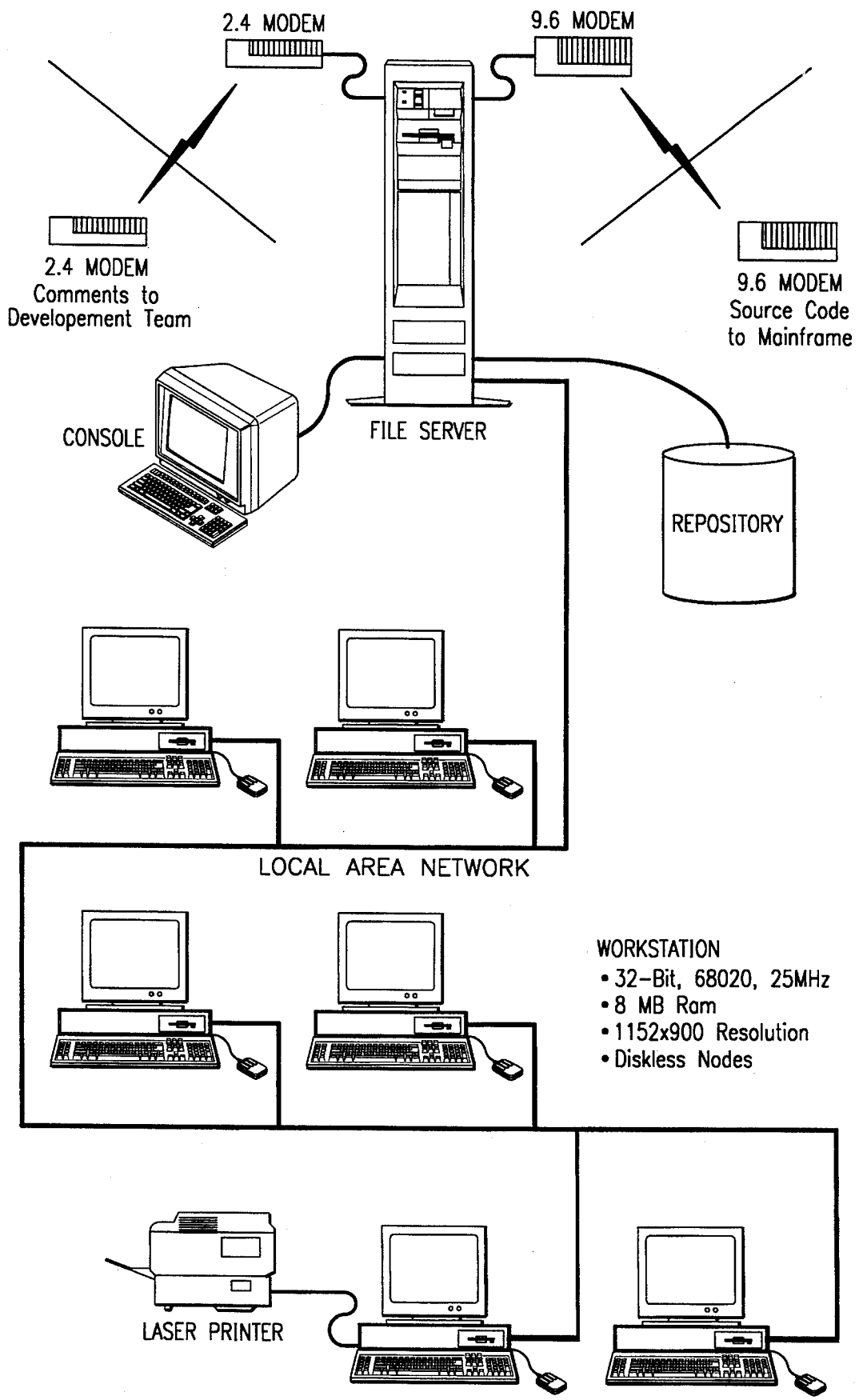

GRAPHIC INFORMATION MODELING AND ICON-BASED INTERMEDIATE TEXT LANGUAGE GENERATION

This application is a continuation, of application Ser. No. 08/153,265, filed Nov. 15, 1993 now abandoned, which is a continuation of application Ser. No. 07/517,840, filed May 2, 1990, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is a new and unique method which relates in general to the Computer Aided System Engineering (CASE) field. Specifically, this invention reveals breakthroughs in 1) information modeling, and 2) intermediate text language.

It should be noted that the specification is supplemented by a complete program listing of the corresponding specific program language (source code) in a Microfiche Appendix containing three hundred twenty-three (323) microfiche pages.

BACKGROUND OF THE INVENTION

In the CASE environment, automated systems production has traditionally been based on a methodology which examines the current physical process in order to determine new system requirements. Such automated systems production based on a process-oriented methodology often results in awkard key structures and access paths, highly unnormalized physical data structures, and programs that are burdened with navigating and updating those data structures.

When pre-defined data structures are available for process development, they are usually a physical data implementation, built to satisfy the data needs of one or more specific processes. These designs are also somewhat constrained by the idiosyncrasies of a particular access method. Also, they are typically based upon physical data implementations to which the system designers were exposed in the past.

Such constraints can unduly impact the design of screens, reports and other batch processing. Close ties between processes and physical data structures can make a system difficult to construct and maintain. Further disadvantages are excessively complex data structures and access paths which can result when performance issues are over-emphasized early in a development effort.

SUMMARY OF THE INVENTION

The present invention provides a number of advantages over the prior art, including, but not limited to, (1) an object-oriented approach toward the system design question of how programmers can best manipulate software design entities within the context of a machine workstation environment, and (2) breakthroughs resulting from the ability to formalize and express within the computer system new system building constructs which allow the systems designer and programmer to achieve a higher level of abstraction when creating computer systems.

The processing model employed by this invention creates a universal framework for code generation. The transaction processing model isolates the physical constraints from the logical application processing. The separation of a transaction (either online or batch) into the four-part model, display, syntax edit, reference edit, and processing, allows code to be generated to handle virtually all transaction-oriented processes. This four-part model creates a high-level contruct within which intermediate text language (ITL) can reside.

This invention includes a mechanism, developed through the use of data modeling constructs, to separate the logical design attributes of a computer system from the physical implementation of that computer system. Techniques developed herein enable system designers to concentrate on the logical aspect of computer systems. The mapping of that logical structure to the physical implementation is done automatically. This allows system designers to attain a new level of abstraction when designing computer systems.

The present invention's new universal unique icon based language can be used to formally describe any conventional computer system. The description of computing systems in intermediate text language (ITL) allows later translation into any other sequential computer language. This new level of abstraction afforded by ITL, coupled with its icon based editor, insures program correctness. The interactive ITL editor will not allow incorrect ITL to be entered.

Since ITL is algebraically provable, programs written in ITL cannot end abnormally.

The two constructs described below are unique to the present invention:

1. Information Modeling.

The Information Modeling aspect provides a means of placing system data entities in a single diagram and modeling the crucial elements of the target software system. The following can be accomplished: graphic relationships between the data entities can be displayed; relationships between systems, their underlying subsystems and processes can be created; relationships between files, records, screens, and reports can be created. Then the code for a selected process can be analyzed and generated (discussed under Intermediate Text Language).

This invention is an information model that is a well-defined structure, not just a collection of records. It provides enforced entity/relationship construction rules and offers the promise of assured data integrity via foreign key knowledge. This invention also functions as a springboard for expert systems which typically depend on the intelligence supplied by a well-defined data model.

This method of information modeling (IM) facilitates increased flexibility in the system engineering field. Since this invention offers a data-centered approach to systems design, future changes in processing requirements can be more readily incorporated. Processes are designed based upon the logical IM model, before or after the physical data structure has been solidified. Changes to the physical data structure do not require process re-specification. Changes to the contents of a system and conversion between data base management systems is facilitated by the logical-to-physical mapping.

Via a Data Dictionary means augmented by the IM model, data and relationships (context) are defined in the system. The fully keyed access paths defined by the logical Information Model, along with implied key derivation rules, provide the necessary information for all data storage and retrieval. As a result, automated mapping and scrolling of multiple occurring screen fields is made possible. The "home" data location attributed to each unique Data Table column facilitates the "best record" logic of Code Analyze.

By storing rules non-redundantly at the most general level (such as on the Data Table Column) duplication of specialized code at the procedural level is minimized. Reasonable process input/output sequencing is enforced by and validated against the logical IM model. Based on the defined entities and relationships of the information model, default screen and record layouts may be inferred and generated. In general, the additional rules and knowledge of a well-defined information model permit more powerful inferences and analysis, as well as faster and simpler user design interfaces. Less expertise is required of the system designer.

2. Intermediate Text Language.

When all external views of the system are complete, the analysis/code generation process is activated to make inferences and build the Intermediate Text Language (ITL) for each module. This ITL can then be used for conversion into other high level languages such as PL/I, COBOL, etc. Due to this invention's unique features, entire systems can be designed and generated, delaying the decision of which language to use until later in the development process.

Another key feature of this invention is the fact that the procedures generated are provably correct. Correctness of a procedure is defined to mean that execution of the procedure will terminate in some finite time with no fatal errors.

BRIEF DESCRIPTION OF THE DRAWINGS

The invention, together with further objects and advantages thereof, can best be understood by reference to the following specification, taken in connection with the accompanying drawings, in which:

FIG. 1 represents the hardware used to implement a preferred embodiment of the invention.

DETAILED DESCRIPTION OF THE PREFERRED EMBODIMENT

A preferred embodiment of the method of the present invention is implemented by utilizing a digital computer supported by a hardware platform with the following characteristics:

- High resolution display to support graphical modeling tools
- Windowing capabilities to allow concurrent access to multiple tools
- Multi-tasking operating system to support interprocess communication among various tools
- Local Area Network (LAN) for shared access to the repository and peripherals
- Object server capability to share analysis, design and construction objects across all workstations FIG. 1 illustrates a typical 6 workstation cluster hardware environment wherein systems engineers utilize Sun 3/60 workstations, a product of Sun Microsystems, Inc., Mountain View, Calif., containing a 32-bit, 68020 processor running at approximately 3 MIPS. The workstation contains 8 megabytes of RAM, expandable to 24 megabytes. Each workstation is a diskless node that depends on the central file server for disk storage. The screens are monochrome and provide the 1152×900 pixel resolution and optical mouse support required for sophisticated diagramming. The multi-tasking requirement is satisfied by Berkeley Standard UNIX 3.4; UNIX is a trademark of American Telephone and Telegraph Company. Windowing support is provided by Sun's SunView windowing environment; SunView is a trademark of Sun Microsystems, Inc., Mountain View, Calif. Each workstation is linked to the file server and laser printer via a local area network (LAN).

The file server contains its own 68020 processor with 8 megabytes of RAM and two 892 megabyte disk drives. A standard dumb terminal is used as the system console. A built-in tape drive provides the backup facility. The file server is connected to the development group via a 2400 baud modem. Typically, mainframe access is provided through a 9600 baud modem. No special environment is required to house the file server.

I. OVERVIEW OF PREFERRED EMBODIMENT

This invention makes a significant contribution to the field of Computer Aided Systems Engineering (CASE). This breakthrough concerns advancements in the areas of:

1. Logical Information Modeling
2. Physical Implementation
3. Intermediate Text Language The disclosure which follows will describe each of these in detail below.

1. Logical Information Modeling

The systems engineer enters the basic data flows and file specifications desired. The systems engineer must then invoke the analysis/code Generation procedure. At the end of the Analysis/Code generation session, a message is displayed indicating whether any errors were detected. If errors are detected during the analysis phase, then code will not be generated. Disclosure of these error messages and their meaning reveals, by inference, the underlying rules of this invention's information modeling technique, and enables one skilled in the art to reproduce a similar system.

Due to the complexity of the invention, the description of the preferred embodiment is supplemented by a fully complemented copy of the rules and accompanying error messages which are built into Analyze in Appendix I.

2. Physical Implementation

An integral part of this invention's information modeling technique concerns the efficient processing of transactions. The following describes the function and usage of the On-line Scheduling code that is generated into target programs. This unique code is responsible for controlling the processing of all on-line transactions which are generated by this invention's development environment.

This On-Line Scheduling code operates in basically two modes: 1) NEXT mode and 2) DATA. Depending on the current mode, the On-Line Scheduling code will take either a path which leads to an application displayer being called to format a screen or an application reference editor and processor being called to take some update action based on the data contained on the screen.

Current Status From Terminal Record.

The On-Line Scheduler determines the mode it is in each time it receives control from the telecommunication monitor. This information and other control information is stored in the On-Line Scheduler Terminal file. Each terminal which signs on the On-Line Scheduler must have an entry in the Terminal file. If the system uses terminal security, then the entry must exist prior to signing on the On-Line Scheduler; if not, then the On-Line Scheduler will create the entry in the Terminal file whenever the user signs on for the first time.

1. Process When Mode Is NEXT.

Taking the modes individually, in NEXT mode, the On-Line Scheduler interrogates the current command line, and the current program function keys (if any is active) to determine the "next" function to activate.

a. Determine the Next Function.

Certain of the program function keys result in immediate switching to another function, others depend on the current mode. In next mode, any function key will result in immediate switching.

b. Check Against The Menu Lists

Once the On-Line Scheduler has determined the next function to execute, the function is checked against the menu lists loaded by the scheduler. These lists include both the On-Line Scheduler system menu list and the application menu list. If the function is found in either of these lists a link to the program associated with the function is performed. This link returns the address of the application's Transaction Specification Block (TSB).

c. Set Up the Screen Defaults.

The Scheduler uses the information in the TSB to set up a screen area with all the default screen attributes (highlighting, protection, dark, etc.) which have been defined for the screen in this invention. It uses the file information in the TSB to set up the On-Line Scheduler File Array.

d. Link to the Displayer.

The Scheduler links to the displayer requesting that the displayer use the command line and format the screen. If the displayer is satisfied that the information on the command line is correct and completes the screen, the Scheduler sends the screen back to the terminal, changes to DATA mode, saves the current information on a terminal record, and, returns control to the telecommunication monitor.

2. Process When Mode is Data.

In DATA mode, the On-Line Scheduler assumes a logical process in which each step must be completed prior to the next step being started and if any of the steps fails, an error message is sent to the current screen. Prior to taking those steps, the Scheduler links to the displayer to get the TSB, help pointers, and the names of the application programs to be used by this function.

a. Link to the Syntax Editor.

The first step in the process is the syntax edit step. The syntax editor, usually the one provided by the On-Line Scheduler is linked and passed the address of the screen. The job of a syntax editor is to verify that all the fields on the screen pass the minimum set of edits, such as numeric, alpha, table verification, etc. If any of the edits fail, the syntax editor passes an error return and error message to the Scheduler. The Scheduler in turn sends the screen back to the terminal and saves the current information in the terminal record without changing modes.

b. Link to Reference Editor.

The second step in the process is the reference edit step. The application reference editor, if one has been generated or written, is linked and passed the address of the current screen. The job of a reference editor is to verify relationships between and among any records involved in processing the function. Edits it might perform are: 1) verify that a record to be inserted does not already exist and 2) verify that a record to be updated still exists. If any of the edits fail, the reference editor passes an error return and error message to the Scheduler. The Scheduler then sends the screen back to the terminal and saves the current information in the terminal record without changing modes.

c. Link to the Processor.

The third step in the process is the processor step. The application processor, either generated or handwritten, is linked and passed the address of the current screen. The job of the processor is to carry out any required updates as indicated by the function. If any of these updates fail, the processor passes back an error return. The scheduler assuming that any error from the processor is fatal, then forces an abnormal end and sends a broadcast message to the terminal.

d. Determine Path After Process.

If all the steps are completed error free, the Scheduler has two options, depending on the confirmation indicator in the TSB.

e. Confirmation to Screen Request.

If confirmation is requested for this function, the Scheduler sends a "transaction completed" message to the terminal, changes the mode to "next," saves the current information in the terminal record and returns to the telecommunications monitor.

f. NEXT Process Again

If confirmation is not requested for this function, the Scheduler changes the mode to "next," and goes down the NEXT path as outlined above.

g. Menu List Processing

The basis for determining if a function is authorized in an On-Line Scheduler environment is if the function appears in one of the menu lists which the On-Line Scheduler loads when it starts for the first time in the online session.

There are always two menu lists for each On-Line Scheduler environment, namely: a list of all the On-Line Scheduler generated functions, and a list of the application functions, also generated from an On-Line Scheduler environment.

A menu list provides the hierarchy of functions (determined by the System Component connections of the invention), the action modes for each function, the name of the function displayer module and a flag to indicate whether the function is to be displayed on the menu.

In addition to the proper separation of logical and physical components, this invention facilitates their active integration. The unique logical-to-physical mapping scheme within this invention permits the inferential power of a fully normalized entity/relationship model to be actively utilized by various physical implementations. Since physical system design is based directly upon the logical model, the capability for reasonable default layouts is provided. The unique "clicking" interface along Data Table paths permits lucid and unambiguous input/output sequencing for the various physical design formats.

3. Intermediate Text Language

When all external views of the system are complete, the analysis/code generation process is activated to make inferences and build the intermediate text language (ITL) for each module. To further enable one skilled in the art to reproduce a similar system, the description of the preferred embodiment is supplemented by a complete listing in Backus-Naur Form (BNF) of the syntactic and semantic definition grammar used in the translation from the iconic specification to the textual language in Appendix II.

By using the structured code expert system, this provably-correct ITL code can be viewed and modified with icons that represent the intermediate text language constructs. The ITL can then be translated into a mainframe language. Due to a unique feature of this ITL, entire systems can be designed and generated, delaying the decision of which language to use until mainframe translation. Since the ITL translates into systems that can execute under various operating systems, the on-line monitor decision can be delayed until ITL translation time. This unique feature enables systems developers to develop and test using one on-line monitor, while the production system uses another.

One key unique feature is that the procedures generated by this invention are correct. Correctness of a procedure is defined to mean that execution of the procedure will terminate (in some finite time) and that there are no ABENDs. The idea of terminableness is straightforward, though it should be noted that a finite time could be a very long time. The following section further explains the concept of no ABENDs.

A realization of an abstract or blue-sky procedure is built out of real world components. The real world component does not always match the abstract component because of either a fuzziness in the abstract component, or because of limitations in the real world component. Real world components often have meaning such that if a specific event occurs during execution of the component, then control is transferred to the end of the program. This meaning is normally not included in the intended meaning in the abstract model. The result is a program that has many paths from many components going to the end of the program that are not part of the meaning of the abstract program. These paths are static in the sense that they exist in a program whether the program is run or not. These can be called static paths. Similarly, dynamic paths are those that are actually executed. It is possible for a realization of an abstract procedure to have the same meaning (always gets the same results) as the abstract procedure even though the realization has extra static paths. This occurs when the two have the same dynamic paths. In other words, it is acceptable to have static ABEND paths if they are never taken. To make sure that there are no unintended dynamic paths to the end of a procedure (i.e. that it has no ABENDs), one of two approaches can be taken: change the real world components so that the realization has no static ABEND paths, or show that, despite the extra static paths, there are no extra dynamic paths.

Showing terminableness also can be done one of two ways. The first is to ensure that all structures and components used in the realization will terminate. In this invention, each instance of a structure or component terminates through a single exit path. The second is to allow more freedom but show that, though some structures may not always terminate, in the current use they do.

Procedures generated by the invented system can be viewed on two levels. On one level, these procedures are high level programs in a data base environment. On another level, these procedures are definitions in an intermediate language called ITL. Unlike that of high level languages, the definition of ITL is under control of the development team. It is the interface between this design system and the high level code generation. ITL has only an "intuitive" semantics and a fuzzy boundary between it and the design data base.

Defining the semantics of ITL has some secondary benefits. It establishes a single portable language, even though target languages, such as C, COBOL, or PL/I, might have different meanings for addition, etc. Thus, the invention on the design side of the interface does not need to know about how ITL is coded in different languages. Also, writing down the exact meaning of ITL components and structures can be an aid to those that use the interface such as those who write the target language generators.

The ITL employs a traditional "f(x,y)" style of functional notation almost exclusively to make it readable by a wide range of readers. It uses an abstract syntax instead of a concrete one that Backus-Naur Form (BNF) would provide, because it is easier to associate with the semantics and because there seems to be no text realization of ITL to require a concrete textual syntax.

The following is a demonstration as to why procedures defined by the appended definition always terminate and never ABEND:

ITL procedures never ABEND. Every procedure is a statement. All statements and other program components are either defined to no ABEND or are defined to not ABEND if their components don't. By induction, ITL procedures never ABEND.

Finite ITL procedures always terminate. Every procedure is a statement. Each procedure either has a non-recursive definition and thus terminates, or is a FOR or a SELECT. Only a finite number of WHEN's are allowed for SELECT, so it terminates. In the iterative part of the FOR statement, since the step value is non-zero and numbers are bounded in ITL, then for every starting number and an increment there is a last number. FOR terminates. By induction, ITL procedures terminate.

ITL definition method.

The following may help in the reading of the ITL definition provided later herein.

The meaning of many kinds of programs can be thought of as a function from a world state just before execution of the program to a world state just after execution. The ITL definition uses the traditional but somewhat naive interpretation of world state as the set of pairs associating variables with values. Limiting this view of the world to the values of program variables is satisfactory for our goals. Every statement in ITL is hence viewed as a function from the state of the variables to another state of the variables and a function of the form.

execute(Environment, state, Statement)

is defined for each syntactic type of statement. Thus, in the definition, "execute" is defined many times. The result of this function is, of course, a state.

The Environment mentioned as a parameter in the function "execute" accounts static declarative information, such as whether a variable is numerical and so on.

For expressions, a similar function is defined, except that it must also return a value. It is of the form evaluate(Environment, state, Expression)

and returns a pair consisting of the resulting value of the expression and a new state. In the definition, this pair is often written as <v,s> where v is the value and s is the state. Some statements include more than one expression. You can see the order of execution of the expressions by noting which output states are whose input states in the definition of the statement.

As an example of how the function evaluate is defined for each expression, examine the wordy version of the definition of ADDITION EXPRESSION below. It essentially describes what X+Y means.

ADDITION EXPRESSION

Syntactic Components

First Operand: Numerical expression.

Second Operand: Numerical expression.

Semantics

Where s is the state before execution, a is the instance of ADDITION EXPRESSION to be executed v1 and s1 are the value and state resulting from the evaluation of the first operand with the starting state s, v2 and s2 are the value and state resulting from the evaluation of the second operand with the starting state s1;

the result of evaluating a is (1) a value which is the sum of v1 and v2 coerced to the intermediate accuracy for numerical values, if the sum is within upper and lower limits for intermediate numerical values, 0 otherwise; and (2) a state which is s2 if the sum is within upper and lower limits for intermediate numerical values, but otherwise is s2 modified so that the (new) value of the error message text is whatever the standard arithmetic error message is and no other values are changed.

The second operand evaluation is dependent on the resultant state of the first operand's evaluation, which illustrates from a procedural viewpoint, that the first expression is evaluated first.

Concerning the overflow behavior of evaluating an addition expression, no abnormal control path is available to be taken. A numerical value is always returned. Addition in ITL is still a binary function but not the one in mathematics. Other options could have been to use the upper or lower limits as values instead of 0 at overflow, to add a special overflow symbol to numerical values, or to not bother to set the error message variable. The important thing is that something reasonable happens and things continue. No ABENDs.

Other arithmetic operators have similar definitions. As an example of the way arithmetic in ITL could be compiled in a high level language, such as PL/I, consider the following ITL program (shown in abstract syntactic form) for converting degrees Centigrade to degrees Fahrenheit (F=(9/5)C+32):

```
Assignment Statement
    Place: F
    Expression:
        Addition Expression
            First operand:
                Multiplication Expression
                    First Operand:
                        Division Expression
                            First Operand: 9
                            Second Operand: 5
                    Second Operand: C
            Second Operand: 32
```

In this example, C and F correspond to ids in the ITL definition which are not defined there. The environment "knows" the total number of digits and the number of digits to the right of the decimal place for C and F. Regardless of the representation in the environment, after translation to PL/I they are assumed to have been declared as follows:

DECLARE C FIXED DECIMAL (3,1);

DECLARE F FIXED DECIMAL (4,1);

Then, the following PL/I code could be generated for the ITL program segment above:

DECLARE OVF_FLAG FIXED BINARY (1);
MATH_ERROR = 'Arithmetic resulted in too big of a number; zero is used.';

...
ON FIXEDOVERFLOW DO OVF_FLAG = 1;
ON SIZE DO OVF_FLAG = 1;
ON ZERODIVIDE DO OVF_FLAG = 1;
...
OVF_FLAG = 0;
(SIZE): F = ADD(MULTIPLY(DIVIDE(9,5,15,5)C,15,5),32,15,5);
IF OVF_FLAG = 1 THEN DO;
    F = 000.0;
    TCCR_MSG_TEXT = MATH_ERROR;
END;
...

Note that all of the arithmetic is done in FIXED(15,5) and the result will be converted to FIXED(4,1) for assignment to F. Also note that in general, both SIZE and FIXEDOVERFLOW conditions may be raised during an assignment statement involving arithmetic, so code to handle that possibility is included. Hence, this code is the obvious translation of the ITL code based on the semantics of assignments and expressions.

Of course, the ITL program could have been transformed into code that is potentially more efficient by taking advantage of the properties of the particular ITL code being translated. For instance, consider $$F = 1.8*C + 32;$$

This code always has exactly the same effect on the state as the longer PL/I code above. To see that this is true, let us step through the execution of this assignment statement:

1. The constant 1.8 is FIXED(2,1). In the first program, the division of 9 by 5 would have resulted in the same value, but in FIXED(15,5).

2. Since C is FIXED(3,1), the PL/I rule for precision in the case of fixed-point multiplication implies that the result of 1.8*C will be FIXED(6,2). Clearly, the result will be no larger than 180. In the first program, the exact same value would be computed, but in FIXED(15,5).

3. Since the constant 32 is FIXED(2,0), the PL/I rule for precision in the case of fixed-point addition implies that the result of 1.8*C+32 will be FIXED(7,2). Clearly, the result will be no larger than 212. In the first program, the exact same value would be computed, but in FIXED(15,5).

4. Finally, the result, which is FIXED(7,2), will be converted to FIXED(4,1) and stored in F. But this is exactly the same as what would happen in the first program, where the same value in FIXED(15,5) is converted to FIXED(4,1). Since this value is no larger than 212 there will be no SIZE condition raised. In fact, in each of the previous steps, neither program has the potential for a value that exceeds the space allocated for it. So, no SIZE or FIXEDOVERFLOW condition will be raised in either program. Hence, the code dealing with these conditions is not needed.

Note that the following is not an acceptable translation:

$$F = 9/5*C + 32;$$

The constants 9 and 5 are both FIXED(1,0). According to the PL/I rule for fixed-point division, the result of 9/5 will have precision (15,14). Since C is FIXED(3,1), the result of 9/5*C is FIXED(15,15). For some values of C, such as 1.0, this computation will produce a result which does not fit into a FIXED(15,15). So, this code could result in an ABEND which is not only contrary to the semantics of the original ITL code, but a disaster in terms of the goals of this invention.

ITL DEFINITION

The Environment consists of whatever declarative information is needed to precisely define the meaning of an ITL procedure. It includes references to much of the invention's design data base plus local declarations made with CREATE. Program variables are referenced by what is called an id in this document. Functions of the form f(E,id) are used to extract information from the environment about that id. Some of these functions might be is-a-numerical-variable(E, id), or number-of-digits(E,id). The structure of the environment and that of the id are not defined. (Perhaps an id is a data element reference paired with a dupe number.)

The state is a set of pairs consisting of an id (representing a program variable) and its value. Primitive functions that operate on a state are:

initial-state(E) which creates the initial state with valid values for each program variable, value(s,p) which gets the value for that place (see definition below), update(s,p,v) which returns a new state which is like the old one except that value v is now at place p, install(s,id,v) which returns a new state which has the pair <id,v> added to s, and remove(s,id) which returns a new state which is the same as s except the pair for the id is removed.

The important state functions are value(s,p), and update(s, p,v).

A place is either the id of a numerical program variable or a triple consisting of a string program variable and start and end positions. Note that it is possible for only part of a variable to be changed in an update.

All definitions are defined functionally. The "Where" notation is designed to make function definitions readable and should not be interpreted procedurally. The functions if, or, and and are used in their sense. That is, if is a selector function.

ITLCODE
   Syntactic Components
   Environment:
   Procedure: Statement.
   Semantics
   Where
      I is an instance of itl code,
      E=environment(I),
      s=initial-state(E),
   meaning(I)=execute(E,s,procedure(I)).
   Note
   Defining the meaning of a program as its final state is of course not exactly right, but is suitable for the purpose of the ITL definition. Defining it as the sequence of calls to "secondary functions" is better, but one that defines changes to the data base would be better yet but must be done on a larger scope.

STATEMENT

A Statement is either a compound statement, an error-message statement, an assignment statement, an if statement, a for statement, a "secondary function" statement, a select statement, or a create statement.

COMPOUND STATEMENT
   Syntactic Components
   First Statement: Statement.
   Second Statement: Statement.
   Semantics
   Where
      E is the environment,
      s is the state before execution,
      C is an instance of compound statement,
      s1 execute(E,s,first-statement(C)),
      s2 execute(E,s1,second-statement(C)),
   execute(E,s,C)=s2.

ERROR-MESSAGE STATEMENT
   Syntactic Components
   Message: String expression.
   Semantics
   Where
      E is the environment,
      s is the state before execution,
      M is an instance of error-message statement,
      <v,s1> evaluate(E,s,message(M)),
   execute(E,s,M)=update(s1,error-message,v).

ASSIGNMENT STATEMENT
   An assignment statement is either
   a numerical assignment statement, or
   a string assignment statement.

IF STATEMENT
   Syntactic Components
   Condition: Boolean expression.
   First statement: Statement.
   Second statement: Statement.
   Semantics
   Where
      E is the environment,
      s is the state before execution,
      I is an instance of if statement,
      <v,s1>=evaluate(E,s,condition(I)),
      s2=execute(E,s1,first-statement(I)),
      s3=execute(E,s1,second-statement(I)),
   execute(E,s,I)=if(is-true(v),s2,s3).

FOR STATEMENT
   Syntactic Components
   Loop index: Id.
   Start value: Numerical expression.
   End value: Numerical expression.
   Increment value: Numerical expression.
   Body: Statement.
   Semantics
   Where

---

E is the environment,
s is the state before execution,
F is an instance of for statement,
<vs,s1> = evaluate (E,s,start-value(F))
<ve,s2>= evaluate(E,s1,end-value(F)),
<vi,s3>= evaluate(E,s2,increment-value(F))
new-loop-var(E,1,v) creates a new environment such that value(E,1) = v, and is-a-loop-var(E,1) = true,
iterate(v,sv) if
   or( and(v≦ve,vi>0) and(v>ve,vi<0))'

```
        iterate(
            v+vi,
            execute
                new-loop-var(E,loop-index(F),v),
                sv,
                body(F)),
        sv);
execute(E,s,F) if(vi=0, s3, iterate(vsvs3))
```

Note

Consider the loop index as a lexically scoped named constant. The body is executed with different values for that constant.

SECONDARY FUNCTION STATEMENT

A secondary function statement can be one of several. A dummy is described below as an aid in the writing of definitions. It can also be used as an indefinite place holder, if no secondary functions are defined. Some amount of vagueness is acceptable.

DUMMY SECONDARY FUNCTION

| Syntactic Components |
|---|
| Alice: Numerical expression.
Betty: String expression.
Carla: Numerical place.
...
Zelda: String place. |

Semantics

Places and values are evaluated A to Z resulting in a new state. Execute(E,s,F) is a new state based on that one with possibly the above places changed.

SELECT STATEMENT

Syntactic Components

Selector: Numerical expression.

When list: List of When clauses,
    where a When clause has syntactic components
        Literal value: Literal numerical value,
        Clause body: Statement, Otherwise clause: Statement.

Semantics

Where

```
E is the environment,
s is the state before execution,
S is an instance of select statement,
<v,s1> = evaluate(E,s,selector(S)),
select(w) = if(
    empty(w),
    execute(E,s1,otherwise-clause(S)),
    if(
        v = literal-value(first(w)),
        execute(E,s1,clause-body(w)),
        select(rest(w))));
execute(E,s,S) = select when-list(S)).
```

CREATE STATEMENT

Syntactic Components

Create Specification:

Create body: Statement.

Semantics

Where

E is the environment, s is the state before execution,

C is an instance of create statement, i is the new id created from E, and create-specification(C), E1 is the new environment created from E, and create-specification(C), v is the initial value for i created front E, and create-specification(C), s1=install(s,i,v), s2=execute(E1,s1,create-body(C)), s3=remove(s2,i);

execute(E,s,C)=s3.

Note

This is a lexically scoped general purpose variable declaring mechanism much like let in lisp.

Numerical Expression and Assignment

Every numerical value in ITL has a decimal point. Accuracy in intermediate calculations is to 5 places to the right of the decimal point. A parameter of numerical variables is the accuracy which may be from 0 to 5 places to the right of the decimal point. Intermediate calculations are constrained by the limit of ±9,999,999,999.99999. Parameters of numerical variables include the minimum and maximum values allowed to be stored in that program variable. Functions over the Environment and the id representing the variable represent the way the ITL definition "knows" about the parameters.

NUMERICAL ASSIGNMENT STATEMENT

Syntactic Components

Lefthand side: Numerical place.

Righthand side: Numerical expression.

Semantics

Where

E is the environment, s is the state before execution,

A is an instance of numerical assignment statement,

<p,s1>=place(E,s,left-hand-side(A)),

<v,s2>=evaluate(E,s1,right-hand-side(A)), d1=most-pos-number(E,p), d2=most-neg-number(E,p), v1=limited-to-accuracy(accuracy(E,p),v), s3=update(s2,p,v1), s4=update(update(s2,p,0), error-message, "Arithmetic resulted in too big of a number; zero is used."), execute (E,s,A)=if($d2 \leq v1 \leq d1$,s3,s4).

NUMERICAL PLACE

A numerical place is a numerical program variable.

NUMERICAL EXPRESSION

A numerical expression is either an addition expression, a subtraction expression, a multiplication expression, a division expression, a negation expression, or an atomic expression.

ADDITION EXPRESSION

Syntactic Components

First Operand: Numerical expression.

Second Operand: Numerical expression.

Semantics

Where

```
E is the environment,
s is the state before evaluation,
N is an instance of addition expression,
<v1,s1>= evaluate(E,s,first-operand(N)),
<v2,s2 >= evaluate(E,s1,second-operand(N)),
v = coerce-to-intermediate-accuracy(v1+v2),
evaluate(E,s,N) = if(
    within-intermediate-range(v),
    <v,s2>,
```

15
-continued

<0,update(s2,error-message, "Arithmetic resulted in too big of a number; zero is used.")>).

SUBTRACTION EXPRESSION
Syntactic Components
First Operand: Numerical expression.
Second Operand: Numerical expression.
Semantics
Where E is the environment,
s is the state before evaluation,
N is an instance of subtraction expression,
<v1,s1>= evaluate(E,s,first-operand(N)),
<v2,s2>= evaluate(E,s1,second-operand(N)),
v = coerce-to-intermediate-accuracy(v1-v2)
evaluate(E,s,N) if(
    within-intermediate-range(v),
    <V,s2>,
    <0,update(s2,error-message, "Arithmetic resulted in too big of a number; zero is used.")>).

MULTIPLICATION EXPRESSION
Syntactic Components
First Operand: Numerical expression.
Second Operand: Numerical expression.
Semantics
Where E is the environment,
s is the state before evaluation,
N is an instance of multiplication expression,
<v1,s1>= evaluate(E,s,first-operand(N))
<v2,s2>= evaluate(E,s1,second-operand(N))
v = coerce-to-intermediate-accuracy(v1*v2)
evaluate(E,s,N) if(
    within intermediate-range(v),
    <v,s2>
    <0,update(s2,error-message, "Arithmetic resulted in too big of a number; zero is used.")>).

DIVISION EXPRESSION
Syntactic Components
First Operand: Numerical expression.
Second Operand: Numerical expression.
Semantics
Where E is the environment,
s is the state before evaluation,
N is an instance of division expression,
<v1,s1>= evaluate(E,s,first-operand(N)),
<v2,s2>= evaluate(E,s,1,second-operand(N)),
v = if(
v2 = 0
0,
coerce-to-intermediate-accuracy(v1/v2);
evaluate(E,s,N) if(
    and(within-intermediate-range(v),v2,<>0),
    <v,s2>,
    <0,update(s2,error-message, "Arithmetic resulted in too big of a number; zero is used.")>).

NEGATION EXPRESSION
Syntactic Components
Operand: Numerical expression.
Semantics
Where E is the environment,
s is the state before evaluation,
N is an instance of negation expression,
<v,s1>evaluate(E,s,operand(N)),
evaluate(E,s,N)<–v,s1>

ATOMIC EXPRESSION
An atomic expression is either
a numerical variable,
a loop index, or
a literal numerical value.

NUMERICAL VARIABLE
Syntactic Components
Variable: id.
Semantics
Where
E is the environment,
s is the state before evaluation,
N is an instance of numerical variable,
evaluate(E,s,N)<value(s,variable(N)),s>, and
place(E,s,variable(N))=variable(N).

LOOP INDEX
Syntactic Components
Loop index: Id.
Semantics
Where
E is the environment,
s is the state before evaluation,
N is an instance of loop index,
evaluate(E,s,N)=<value(E,loop-index(N)),s>.

LITERAL NUMERICAL VALUE
Syntactic Components
Literal value: Numeric constant.
Semantics
Where
E is the environment,
s is the state before evaluation,
N is an instance of literal numerical value,
evaluate(E,s,N)=<literal-value(N),s>.
Note
The syntactic numeral is coerced to a mathematical number.

Boolean Expression

BOOLEAN EXPRESSION
A Boolean expression is either
a conjunction expression,
a disjunction expression,
a Boolean negation expression, or
an atomic Boolean expression.

CONJUNCTION EXPRESSION
Syntactic Components
First Operand: Boolean expression.
Second Operand: Boolean expression.
Semantics
Where
E is the environment,
s is the state before evaluation,
B is an instance of conjunction expression,
<v1,s1>=evaluate(E,s,first-operand(B)),
<v2,s2>=evaluate(E,s1,second-operand(B)),
evaluate(E,s,B)=<and(v1,v2),s2>

DISJUNCTION EXPRESSION
Syntactic Components
First Operand: Boolean expression.
Second Operand: Boolean expression.
Semantics
Where
E is the environment,
s is the state before evaluation,
B is an instance of disjunction expression,
<v1,s1>=evaluate(E,s,first-operand(B)),
<v2,s2>=evaluate(E,s1,second-operation(B)),
evaluate(E,s,B)=<or(v1,v2),s2>.

BOOLEAN NEGATION EXPRESSION
Syntactic Components
First Operand: Boolean expression.
Semantics
Where
E is the environment,
s is the state before evaluation,
B is an instance of Boolean negation expression,
<v,s1>=evaluate(E,s,first-operand(B)),
evaluate(E,s,B)=<not(v),s1>.

ATOMIC BOOLEAN EXPRESSION
An atomic Boolean expression is either
a numeric comparison,
a string equality comparison,
a Boolean literal value expression.

NUMERIC COMPARISON
A numeric comparison is either
numeric =,
numeric <,
numeric >,
numeric < or =,
numeric > or =.
Only one is defined below. The rest are similar.

NUMERIC
Syntactic Components
First Operand: Numerical expression.
Second Operand: Numerical expression.
Semantics
Where
E is the environment,
s is the state before evaluation,
B is an instance of numeric comparison,
<v1,s1>=evaluate(E,s,first-operand(B)),
<v2,s2>=evaluate(E,s1,second-operand(B)),
evaluate(E,s,N)=<v1=v2,s2>.

STRING EQUALITY COMPARISON
Syntactic Comnonents
First Operand: String expression.
Second Operand: String expression.
Semantics
Where
E is the environment,
s is the state before evaluation,
B is an instance of string comparison,
<v1,s1>=evaluate(E,s,first-operand(B)),
<v2,s2>=evaluate(E,s1,second-operand(B))
evaluate(E,s,N)=<v1=v2,s2>.

BOOLEAN LITERAL VALUE EXPRESSION
Syntactic Components
Literal value: Boolean constant (true or false).
Semantics
Where
E is the environment,
s is the state before evaluation,
B is an instance of loop index expression,
evaluate (E,s,B)<literal-value(B),s>.

String Expressions and Assignment

String values are a sequence of 0 to 4000 characters. String program variables are assigned a fixed length from 1 to 4000. The function string-adjust(1,v) adjusts the string v to length 1 by either padding with blanks or dropping off the righthand characters. Note that string expressions use string-adjust(4000,v), effectively making the suing accumulator 4000 characters long.

STRING ASSIGNMENT STATEMENT
Syntactic Components
Lefthand side: String place.
Righthand side: String expression.
Semantics
Where
E is the environment,
s is the state before execution,
A is an instance of string assignment statement,
<p,s1>place(E,s,left-hand-side(A)),
<v,s2>=evaluate(E,s1,right-hand-side(A)),
1=length(E,p),
v1=string-adjust(1,v),
s3=update(s2,p,v1),
execute(E,s,A )=s3.

STRING PLACE
A string place is either
a string program variable,
a substring place, or
possibly other primary functions.

STRING PROGRAM VARIABLE
Syntactic Components
Variable: Id.
Semantics
Where
E is the environment,
s is the state before execution,
S is an instance of string program variable,
p=<variable(S),1,length(E,variable(S))>[6]
evaluate(E,s,S)=<value(s,variable(S)),s>, and
place(E,S)=<p,s>.

SUBSTRING PLACE
Syntactic Components
Place: String place.
Base position: Numerical expression.
Length: Numerical expression.
Semantics
Where
E is the environment,
s is the state before execution,
S is an instance of substring place,
<<i,ks,ke>,s1>=place(E,place(S)),
<v1,s2>=evaluate(E,s1,base-position(S)),
<v2,s3>=evaluate(E,s2,length(S)),
vs=if(v,<1,1,v1,)+ks−1,
ve=min(ke,if(v2<0,0,v2)+ks−1);
place(E,s,S)<<i,vs,ve>,s3>.

STRING EXPRESSION
A string expression is either a concatenation, or a value from a string place.

VALUE FROM A STRING PLACE

Syntactic Components

Place: String place.

Semantics

Where

E is the environment, s is the state before execution,

V is an instance of value from a string place,

<p,s2>=place(E,place(V);

evaluate(E,s,V)=<value(s2,p),s2>.

CONCATENATION

Syntactic Components

First operand: String expression.

Second operand: String expression.

Semantics

Where

E is the environment, s is the state before evaluation,

C is an instance of concatenation,

<v1,s1>=evaluate(E,s,first-operand(C)),

<v2,s2>=evaluate(Ef,s,second-operand(C)), v3 is the pasting together of v1 and v2, v4=string-adjust(4000,v3);

evaluate(E,s,C)=<v4,s2>

It should be understood that the present invention is not limited to the precise structure of the illustrated embodiments, it being intended that the foregoing description of the presently preferred embodiments be regarded as an illustration rather than as a limitation of the present invention. It is the following claims, including all equivalents, which are intended to define the scope of the invention.

GRAPHIC INFORMATION MODELING AND ICON-BASED INTERMEDIATE TEXT LANGUAGE GENERATION

APPENDIX I

RULES AND ACCOMPANYING ERROR MESSAGES

The following sections detail the rules that are built into Analyze. The format of the descriptions is as follows:
- o RULE
- o ERROR message(s) that describe how the RULE was violated
- o Description, where applicable, of the above.

COMMON RULES (1-1999)

m030cm0001 f:
RULE: Binary fields must have a length of 15 or 31.
ERROR: ... Data Element, dddd, has an invalid length (ll).
ERROR: ... Please change field definition.
 dddd is the long name of the Data Element. ll is the specified length of the Data Element. The Data Element's format is specified as Binary, BUT the length is not 15 or 31. You must change the Data Element definition.

m030cm0002 f:
RULE: All Data Elements must have a valid Screen edit pattern.
ERROR: ... Invalid field %s because: MESSAGE m030cm0003 f:
RULE: All Data Elements must have a valid report edit pattern.
ERROR: ... Invalid field ff because: MESSAGE
ff is the long name of the Data Element. MESSAGE is a further description of the error. You must modify the Data Element.

m030cm0004 f:
RULE: A PHYS MAP name may only contain ALPHABETIC,
RULE: NUMERIC and SPACE characters.
The name of the phys map indicated after the error message has invalid characters in it. Use the appropriate design tool to correct the problem.

m030cm0005 f:
RULE: A Field label may not start with a digit.
ERROR: ... Field mm has an invalid name.
mm is the map name of the Field. The Field name has invalid characters in it. Use the appropriate RULE: A Field label may not start with a digit.
ERROR: ... Field mm has an invalid name.
mm is the map name of the Field. The Field name has invalid characters in it. Use the appropriate design tool to correct the problem.

m030cm0006 f:
RULE: A Column label may only contain A - Z, 0 - 9 and SPACE characters.
ERROR: ... Column cc contains at least one invalid character (%d) '%1.1s'.
cc is the Column long name. The Column label has invalid characters in it. Use the appropriate design tool to correct the problem.

m030cm0007 f:
RULE: A Column label may not start with a digit.
ERROR: ... Column cc has an invalid name.
cc is the Column long name. The Column label has invalid characters in it. Use the appropriate design tool to correct the problem.

COMMON ERRORS (2000-3999)

GLOSSARY

'physical object' is used as a generic term for Screens, Transactions, Records or Reports.

'entity' is used as a generic term for instances and relates on the invention's data base.

ACCESS INTENT refers to hierarchy of Logical Structures that are used to define the access intent when doing input/output.

Field refers to a Modeled Field or a Derived Field.

FIELD_LABEL_GROUP refers to the heading labels chained to identify a Field.

Logical Structure refers to hierarchy of Data Tables that are used to define a physical object.

PHYS MAP is used to represent the connection from a physical object to an AD18 entity.

m030cm2000 f:
Corrupt data found.
WHEN: 'wwww'
ERROR: NODE type = tttt
ERROR: NODE key = (inst type, id1, id2, id0).
ERROR: NODE status = ssss.
ERROR: NODE reply code = rc1, database reply code = rc2.
This is the standard error action that Analyze takes when Corrupt data is encountered. Another error message may occur after this message that further identifies the error.

wwww - The stage of analysis when the error was encountered.
tttt - The type of the offending entity (eg. Data Element or INCLUDED Column)
(inst type, id1, id2, id0) - The invention's data base key of the offending entity.
ssss - The status of the offending entity, one of the following:
    100: NEW/MODIFIED or
    102: DELETED    or
    0 : UNCHANGED rc1 - The error code that applies to the offending entity, if any.
rc2 - The error code that applies to data base input/output, if any.

These messages may be preceded by a set of messages that identify corrupt data.

m030cm2001 f:
ERROR: Wrong NODE type - type tttt expected!.
tttt is the entity expected. (e.g. Data Element, Included Column, etc.) Analyze has detected corrupt data.

m030cm2002 f:
ERROR: Node should be one of:
ERROR:    tttt
ERROR:    etc.
tttt is the entity expected. (e.g. Data Element, Included Column, etc.) etc. represents the other expected entities.

m030cm2003 f:
ERROR: A NODE of type tttt MUST have a subord structure.
tttt is the entity expected. (e.g. Data Element, Included Column, etc.) This may happen if there is insufficient memory to allocate the subordinate structure. If a memory allocation failed then try to reduce the number of tools that are loaded and then attempt to re-run Analyze.

m030cm2004 f:
ERROR: Entity has a status indicating that it has NO data.
This may happen if there is insufficient memory to allocate the Data structure. If a memory allocation failed then try to reduce the number of tools that are loaded and then attempt to re-run Analyze.

m030cm2005 f:
ERROR: Entity was unsuccessfully read from the database.
An attempt was made to read an entity that does not exist on the database. Use the appropriate design tool to try to correct the problem.

m030cm2006 f:
ERROR: Entity has a BAD 'prime id0'.
Analyze has detected a corrupt PRIME ID0 chain on the database Use the appropriate design tool to try to correct the problem.

m030cm2007 f:
ERROR: Entity has a BAD 'prime2 id0'.
Analyze has detected a corrupt PRIME2 ID0 chain on the database Use the appropriate design tool to try to correct the problem.

m030cm2008 f:
ERROR: Entity has a BAD 'to rel id0'.

Analyze has detected a corrupt TO REL IDO chain on the database Use the appropriate design tool to try to correct the problem.

m030cm2009 f:
ERROR: NODE of type tttt should have an active 'from' pointer.
tttt is the type of the offending entity (e.g. Data Table) Analyze has encountered an entity that belongs in a chain BUT is not chained. Use the appropriate design tool to try to correct the problem.

m030cm2010 f:
ERROR: Non-circular 'to' and 'from' pointers.
Analyze has detected a corrupt chain on the database. Following 'to' and 'from' pointers should trace the same entities. Use the appropriate design tool to try to correct the problem.

m030cm2011 f:
ERROR: Inconsistent 'to' and 'from' pointers.
Analyze has detected a corrupt chain on the database. Following 'to' and 'from' pointers should trace the same entities. Use the appropriate design tool to try to correct the problem.

m030cm2012 f:
ERROR: No 'superior' pointer.
Analyze has detected a corrupt chain on the database. No SUPERIOR was found when one was expected. Use the appropriate design tool to try to correct the problem.

m030cm2013 f:
ERROR: Inconsistent 'superior' and 'child' pointers.
Analyze has detected a corrupt chain on the database. Following 'superior' and 'child' pointers should trace the same entities. Use the appropriate design tool to try to correct the problem.

m030cm2014 f:
ERROR: 'superior' NODE points to NODE for which it is NOT a child.
Analyze has detected a corrupt chain on the database. Following 'superior' and 'child' pointers should trace the same entities. Use the appropriate design tool to try to correct the problem.

m030cm2015 f:
ERROR: EITHER access intent struct out of sequence
ERROR:     OR Programming error on call to CM800_Check_access_intent_chain!
Analyze has detected a corrupt chain on the database. The Access Intents should be chained in the same sequence as the Logical Structures for the physical object. Load the appropriate Design tool to rebuild the object.

m030cm2016 f:

ERROR: Access intents out of sequence with Logical Structure!
Analyze has detected a corrupt chain on the database. The Access Intents should be chained in the same sequence as the Logical Structures for the physical object. Load the appropriate Design tool to rebuild the object.

m030cm2017 f:
ERROR: Invalid access intent for action mode aaa.
The Access Intent for action mode aaa does not have a valid value. The supported access intents are: READ, INSERT, UPDATE, DELETE, Summary and COPY/ADD. Load the appropriate Design tool to rebuild the object.

m030cm2018 f:
ERROR: Data Element, dddd, has an invalid length.
ERROR: Please change field definition.
dddd is the long name of the Data Element. You must change the length of the Data Element.

m030cm2019 f:
ERROR: Data Element, dddd, is flagged as an INDEX field.
ERROR: No logic exists to support INDEX fields at present.
ERROR: Please change field definition.
dddd is the long name of the DE. You must change the field definition of the Data Element.

m030cm2020 f:
ERROR: Data Element, dddd, is flagged as a DATE field.
ERROR: No logic exists to support DATE fields at present.
ERROR: Please define field as CHARACTER or ZONED.
dddd is the long name of the Data Element. You must change the field definition of the Data Element.

m030cm2021 f:
ERROR: Data Element, dddd, has an unknown format.
ERROR: Please change field definition.
dddd is the long name of the Data Element. You must change the field definition of the Data Element.

m030cm2022 f:
ERROR: Wrong NODE type. One of the following node types expected:-
MODEL report Field LABEL Group
MODEL Screen Field LABEL Group
The entity encountered did not have one of the above expected node types. Load the appropriate Design tool to rebuild the object.

m030cm2023 f:
ERROR: Modeled field has no data!
This may happen if there is insufficient memory to allocate the Data structure. If a memory allocation failed then try to reduce the number of tools that are loaded and then attempt to re-run Analyze.

m030cm2024 f:
ERROR: Modelled field has no substructure!

This may happen if there is insufficient memory to allocate the subordinate structure. If a memory allocation failed then try to reduce the number of tools that are loaded and then attempt to re-run Analyze.

m030cm2025 f:
ERROR: A Modelled field must be connected to an Included column.
The target Included Column of the Modeled Field does not exist. Load the appropriate Design tool to rebuild the object.

m030cm2026 f:
ERROR: Header for modelled field has no substructure!
This may happen if there is insufficient memory to allocate the subordinate structure. If a memory allocation failed then try to reduce the number of tools that are loaded and then attempt to re-run Analyze.

m030cm2027 f:
ERROR: Header for modelled field has no label connected!
The target label of the Field label group does not exist. Load the appropriate Design tool to rebuild the object.

m030cm2028 f:
ERROR: Modelled field has errors in its heading list!
The Field Label Group list for the Modeled Field is invalid. Load the appropriate Design tool to rebuild the object.

m030cm2029 f:
ERROR: Derived field has no data!
This may happen if there is insufficient memory to allocate the Data structure. If a memory allocation failed then try to reduce the number of tools that are loaded and then attempt to re-run Analyze.

m030cm2030 f:
ERROR: Derived field has no subordinate!
This may happen if there is insufficient memory to allocate the subordinate structure. If a memory allocation failed then try to reduce the number of tools that are loaded and then attempt to re-run Analyze.

m030cm2031 f:
ERROR: A derived field must be connected to a Data Element.
The target Data Element of the Derived Field does not exist. Load the appropriate Design tool to rebuild the object.

m030cm2032 f:

ERROR: Header for derived field has no substructure!
This may happen if there is insufficient memory to allocate the subordinate structure. If a memory allocation failed then try to reduce the number of tools that are loaded and then attempt to re-run Analyze.

m030cm2033 f:
ERROR: Header for derived field has no label connected!
The target Label of the Field Label Group does not exist. Load the appropriate Design tool to rebuild the object.

m030cm2034 f:
ERROR: Derived field has errors in its heading list!
The Field Label Group list for the Modeled Field is invalid. Load the appropriate Design tool to rebuild the object.

m030cm2035 f:
ERROR: Literal for Field does not have the correct format.
A Field with a literal source has a literal value whose format does not match the Field's edit pattern. Use the appropriate design tool to correct the problem.

m030cm2036 f:
ERROR: Superior phys map node expected.
ERROR: Phys map component has no superior phys map!
The Phys Map chain is corrupt. Load the appropriate Design tool to rebuild the object.

DATA TABLE RULES (1-1999)

RULE: A Data Table must be defined before analysis.
Analyze detected a reference to a non-existent Data Table.

RULE: A Data Table must have a Primary KEY.
Analyze detected that the specified Data Table has no Primary key information.

RULE: A Data Table column may have only one HOME location.
Analyze detected that the specified column has more than one Record nominated as its home location. The HOME location for a Column is the field in a Record that is defined to be the 'master' copy for the Column. ALL updates are made to the home location whenever a Column is modified.

RULE: EVERY column in a Data Table must have a HOME location once that Data Table is mapped onto physical Record(s).
Analyze detected that the specified column has more no home location but the Data Table participates in at least one Record. The home location for a Column is the field in a Record that is defined to be the 'master' copy for the Column. ALL updates are made to the home location whenever a Column is modified. Once a Data Table is mapped onto a physical Record then the home location information must be specified for all columns in that Data Table.

RULE: A Data Table may NOT have multiple non-FK PK key components that are System ASSIGNED.

Analyze detected that the Data Table has multiple non-FK PK key components that are designated as System Assigned. This is illogical. A System Assigned key component is one that has its value assigned by the system at the time the row is inserted into the application database.

RULE: A new or modified FOREIGN KEY MUST be validated against its PARENT DT.
This is provided for information purposes only. If the Parent Data Table is not defined to be accessed through the relationship that is the source of the Foreign Key inheritance, then the Analyze tool will automatically generate all of the code to verify the Foreign Key value; this is to ensure referential integrity for Insert and Change modes.

RULE: A Data Table row that is to be inserted must have ALL NO NULLS columns defined.
Self-explanatory.

DATA TABLE ERRORS (2000-3999)

These messages may be preceded by a set of messages that identify corrupt data. Those messages will also identify which phase of Analyze detected the problem, in particular, whether the error was detected when validating the Screen or a specific Record etcetera.

GLOSSARY

'physical object' is used as a generic term for Screen, Transaction, Record, report etcetera.

'Logical Structure' refers to hierarchy of Data Tables that are used to define a physical object.

RELATE NODE is the relationship node defined on an Information Model (IM) diagram.

FROM ARC is used to represent the connection from a Data Table to a relate node.

TO ARC is used to represent the connection from a relate node to a Data Table.

m030dt2001 f:
ERROR: Every Data Table MUST have an associated DATA structure.
This may happen if there is insufficient memory to allocate the data structure. If a memory allocation failed then try to reduce the number of tools that are loaded and then attempt to re-run Analyze.

m030dt2002 f:
ERROR: Every Data Table MUST have an associated subordinate structure.

This may happen if there is insufficient memory to allocate the subordinate structure. If a memory allocation failed then try to reduce the number of tools that are loaded and then attempt to re-run Analyze.

m030dt2003 f:
ERROR: Every Data Table MUST contain at least one column.
Analyze has detected a Data Table that has NO associated Columns. This is illogical. Load the IM diagram to determine if the named Data Table has any Columns associated with it.

m030dt2004 f:
ERROR: Bad Column NODE pointer detected.
Analyze has detected a node that is NOT for a Column on the Column list for the given Data Table. This is illogical. Load the IM diagram again.

m030dt2005 f:
ERROR: Every Column MUST have an associated DATA structure.
This may happen if there is insufficient memory to allocate the data structure. If a memory allocation failed then try to reduce the number of tools that are loaded and then attempt to re-run Analyze.

m030dt2006 f:
ERROR: Every Column MUST have an associated subordinate structure.
This may happen if there is insufficient memory to allocate the subordinate structure. If a memory allocation failed then try to reduce the number of tools that are loaded and then attempt to re-run Analyze.

m030dt2007 f:
ERROR: Every Column MUST have an associated parent pointer.
This may happen if there is insufficient memory to allocate the subordinate structure. If a memory allocation failed then try to reduce the number of tools that are loaded and then attempt to re-run Analyze. This may also happen if the Data Table, that the given Column is a member of, has been deleted.

m030dt2008 f:
ERROR: Invalid parent pointer for Column.
ERROR: PARENT = (p0, p1, p2, p3)
This message indicates an error during the load process. (p0, p1, p2, p3) is the key of the Data Table in which the given Column participates. This message is followed by the name of the Column.

m030dt2009 f:

ERROR: Every Column MUST have an associated Data Element.
This happens if the Data Element has been deleted. Use the IM tool to check that the Column has an associated Data Element and verify that the Data Element exists.

m030dt2010 f:
ERROR: Every Data Table MUST have an associated Primary KEY.
Use the IM tool to check that the Data Table has a Primary KEY. If the Data Table has no associated Primary KEY then use the IM tool to define the Primary KEY.

m030dt2011 f:
ERROR: Every DT KEY Group MUST have associated data.
This may happen if there is insufficient memory to allocate the data structure. If a memory allocation failed then try to reduce the number of tools that are loaded and then attempt to re-run Analyze.

m030dt2012 f:
ERROR: Non-PK entry found for KEY Group NODE on Primary KEY list.
When validating the Primary KEY definition for a Data Table, Analyze detected an object that is not a Primary KEY object.

m030dt2013 f:
ERROR: Primary Key Group has invalid attributes.
ERROR: ND = nd, NN = nn, NC = nc
ERROR: Data Table 'dddd'.
A Primary Key must have attributes of NO DUPLICATES(ND), NO NULLS(NN) and NO CHANGE(NC). The given Data Table, with name 'dddd', does not conform to these attributes. Try editting the given Data Table with the IM tool to correct this error and then re-analyze.

m030dt2014 f:
ERROR: Non-FK entry found for Key Group NODE on FOREIGN Key list.
When validating the FOREIGN Key definition for a Data Table, Analyze detected an object that is not a FOREIGN Key object.

m030dt2015 f:
ERROR: Every DT Key Group MUST have an associated subordinate.
This may happen if there is insufficient memory to allocate the subordinate structure. If a memory allocation failed then try to reduce the number of tools that are loaded and then attempt to re-run Analyze.

m030dt2016 f:
ERROR: Every Key Group COMPONENT MUST have an associated DATA structure.
This may happen if there is insufficient memory to allocate the data structure. If a memory allocation failed then try to reduce the number of tools that are loaded and then attempt to re-run Analyze.

m030dt2017 f:
ERROR: Every Key Group COMPONENT MUST have an associated subordinate structure.
This may happen if there is insufficient memory to allocate the subordinate structure. If a memory allocation failed then try to reduce the number of tools that are loaded and then attempt to re-run Analyze.

m030dt2018 f:
ERROR: Every Key Group COMPONENT MUST have an associated Column.
Every Key Group COMPONENT - whether a PRIMARY or FOREIGN Key Group COMPONENT, must have an associated Column that represents that component in the Data Table.

m030dt2019 f:
ERROR: Column associated with Key Group COMPONENT must share a common Data Table.
A Key Group COMPONENT may only be associated with a single Data Table. The current Key Group COMPONENT is associated with a Data Table other than the one with which the full Key Group is associated.

m030dt2020 f:
ERROR: EVERY FROM ARC must have an associated subordinate structure.
This may happen if there is insufficient memory to allocate the subordinate structure. If a memory allocation failed then try to reduce the number of tools that are loaded and then attempt to re-run Analyze.

m030dt2021 f:
ERROR: EVERY FROM ARC must have an associated DATA structure.
This may happen if there is insufficient memory to allocate the data structure. If a memory allocation failed then try to reduce the number of tools that are loaded and then attempt to re-run Analyze.

m030dt2022 f:
ERROR: DT FROM ARC chained off invalid Data Table node.
A corrupt chain of FROM ARCS from a Data Table has been detected.

m030dt2023 f:
ERROR: EVERY FROM ARC must have an associated RELNODE.
The target of a DT FROM ARC must be a RELNODE. This error may indicate some corruption of the underlying IM diagram. Use the IM tool to verify that the IM diagram has not been corrupted.

m030dt2024 f:

ERROR: EVERY RELNODE must have an associated subordinate structure.
This may happen if there is insufficient memory to allocate the subordinate structure. If a memory allocation failed then try to reduce the number of tools that are loaded and then attempt to re-run Analyze.

m030dt2025 f:
ERROR: EVERY RELNODE must have an associated DATA structure.
This may happen if there is insufficient memory to allocate the data structure. If a memory allocation failed then try to reduce the number of tools that are loaded and then attempt to re-run Analyze.

m030dt2026 f:
ERROR: RELNODE chained off wrong DT FROM ARC node.
A corrupt chain of FROM ARCS from a Data Table has been detected.

m030dt2027 f:
ERROR: EVERY RELNODE must have an associated TO ARC.
The target of a TO ARC must be a Data Table. This error may indicate some corruption of the underlying IM diagram. Use the IM tool to verify that the IM diagram has not been corrupted.

m030dt2028 f:
ERROR: EVERY TO ARC must have an associated subordinate structure.
This may happen if there is insufficient memory to allocate the subordinate structure. If a memory allocation failed then try to reduce the number of tools that are loaded and then attempt to re-run Analyze.

m030dt2029 f:
ERROR: EVERY TO ARC must have an associated DATA structure.
This may happen if there is insufficient memory to allocate the data structure. If a memory allocation failed then try to reduce the number of tools that are loaded and then attempt to re-run Analyze.

m030dt2030 f:
ERROR: RN TO ARC chained off the wrong RELNODE.
ERROR: TO ARC = (t0, t1, t2, t3)
This error indicates a problem during the load process.

m030dt2031 f:
ERROR: Invalid CARDINALITY (d) on TO ARC for RELNODE 'ssss' ('llll')
The cardinality carried on a TO ARC for a RELNODE with short name 'ssss' and long name 'llll' is unknown. This error may indicate some corruption of the underlying IM diagram. Use the IM tool to verify that the IM diagram has not been corrupted. Try to re-analyze the process.

m030dt2032 f:
ERROR: Bad FROM ARC NODE pointer detected.
The list of FROM ARCs for a Data Table references objects other than DT FROM ARCS.

m030dt2033 f:
ERROR: A FK key component may ONLY be folded onto a PK Column.

Analyze and the Code Generators do not presently support FOLDED Keys that fold onto non-PK Columns.

m030dt2034 f:
ERROR: A FK group may NOT have ALL key components FOLDED.
ERROR: ALL FK key components inherited through RELNODE 'rrrr'
ERROR: ... in Data Table 'dddd' are FOLDED keys.
rrrr is the long name of the RELNODE. dddd is the long name of the Data Table. If all the components of a FOREIGN Key are folded then the relationship through which the inheritance occurs is completely redundant. Load the IM diagram and remove the redundant relationship.

m030dt2035 f:
ERROR: Data Table pppp is the PARENT of ...
ERROR: ... Data Table cccc.
ERROR: 'cccc' is accessed subordinate to 'pppp'.
ERROR: The tables are related through a rrrr relationship.
ERROR: Consequently, PK Column 'column' in 'pppp' should ...
ERROR: inherit its value from the corresponding Column in cccc.
ERROR: However, Column 'source' is NOT a valid source for the inheritance.
pppp is the long name of the parent Data Table cccc is the long name of the child Data Table rrrr will either be dependent or independent column is the name of the Column in error source is the name of the Column from which column is defined to inherit its value 'source' is regarded as an invalid source of inheritance for Column 'column'. This may be as a result of changes to the IM diagram or possibly because of some corruption to the database. Use the appropriate design tool to attempt to define the source of the key inheritance and then try to re-analyze.

m030dt2036 f:
ERROR: Data Table pppp is the PARENT of ...
ERROR: ... Data Table cccc.
ERROR: 'cccc' is accessed subordinate to 'pppp'.
ERROR: The tables are related through a rrrr relationship.
ERROR: Consequently, PK Column 'column' in 'pppp' should ...
ERROR: inherit its value from the corresponding Column in cccc.
ERROR: However, '%s' is NOT the immediate SUPERIOR of '%s'.
pppp is the long name of the parent Data Table cccc is the long name of the child Data Table rrrr will either be dependent or independent column is the name of the Column in error source is the name of the Column from which column is defined to inherit its value 'source' is regarded as an invalid source of inheritance for Column 'column'. Since the tables are accessed in child - parent order then the parent must inherit its key from the child and the child must be immediately superior to the parent in the input/output hierarchy. Use the appropriate design tool to attempt to define the source of the key inheritance and then try to re-analyze.

m030dt2037 f:
ERROR: A PARENT accessed subordinate to its CHILD should inherit ALL PK ColumnS.
ERROR: Consequently, PK Column 'column' in 'pppp' should ...
ERROR: inherit its value from the corresponding Column in cccc.
ERROR: No such inheritance is indicated.
pppp is the long name of the parent Data Table cccc is the long name of the child Data Table. column is the name of the Column in error A parent Data Table accessed subordinate to its child MUST inherit all of its key from the child Data Table. 'column' has no such inheritance defined. Use the appropriate design tool to attempt to define the source of the key inheritance and then try to re-analyze.

m030dt2038 f:
ERROR: Data Table pppp is the PARENT of ...
ERROR: ... Data Table cccc.
ERROR: 'cccc' is accessed subordinate to 'pppp'.
ERROR: The tables are related through a rrrr relationship.
ERROR: Consequently, NON-PK Column 'column' in 'pppp' cannot ...
ERROR: inherit its value from any Column in cccc.
ERROR: Invalid source of inheritance for 'column'.
pppp is the long name of the parent Data Table cccc is the long name of the child Data Table. rrrr will either be dependent or independent column is the name of the Column in error 'column' has an invalid source of inheritance since it is a non-PK Column and the tables are accessed in CHILD - PARENT order. No non-PK Columns in the parent table can have an inherited value when the parent is accessed subordinate to a related child Data Table. Use the appropriate design tool to attempt to define the source of the key inheritance and then try to re-analyze.

m030dt2039 f:
ERROR: An INCLUDED Column can only inherit an FK value from ...
ERROR: ... a superior Data Table that is higher in the I/O hierarchy.
ERROR: Consequently, PK Column 'column' in 'dddd' ...
ERROR: should inherit its value from a superior Data Table that is higher ...
ERROR: in the I/O hierarchy.
ERROR: Inheritance from 'source' in 'tttt' is invalid.
dddd is the long name of the current Data Table. tttt is the long name of the Data Table from which column inherits its value. column is the name of the Column in error. source is the name of the Column from which column is defined to inherit its value This message will only appear for a Data Table brought into the input/output hierarchy in PARENT - CHILD order for a DEPENDENT relationship. The input/output hiearchy has possibly become corrupt or the IM diagram has been modified. Use the appropriate design tool to attempt to define the source of the key inheritance and then try to re-analyze.

m030dt2040 f:
ERROR: Data Table pppp is the PARENT of ...
ERROR: ... Data Table cccc.
ERROR: 'pppp' is accessed subordinate to 'cccc'.
ERROR: The tables are related through a INDEPENDENT relationship.

ERROR: Consequently, NO PK FK Column 'column' in 'pppp' should ...
ERROR: inherit its value from any Column in pppp.
ERROR: Invalid source of inheritance for 'column'.

pppp is the long name of the PARENT Data Table. cccc is the long name of the Child Data Table. column is the name of the Column in error. 'column' has an invalid source of inheritance because the inheritance is through an independent relationship and the tables are accessed in PARENT - CHILD order. Use the appropriate design tool to attempt to define the source of the key inheritance and then try to re-analyze.

m030dt2041 f:
ERROR: Column 'column' in 'tttt' cannot inherit its value.
ERROR: A NON-PK FK Column, 'column', cannot have a source of inheritance ...
ERROR: when brought into the I/O hierarchy through a DEPENDENT relationship.

tttt is the long name of the Data Table in which 'column' participates. column is the name of the Column. column is NOT a part of the PRIMARY key for Data Table tttt. 'column' has an invalid source of inheritance because the inheritance is through an dependent relationship and the tables are accessed in PARENT - CHILD order. Use the appropriate design tool to attempt to define the source of the key inheritance and then try to re-analyze.

m030dt2042 f:
ERROR: Data Table pppp is the PARENT of ...
ERROR: ... Data Table cccc.
ERROR: 'pppp' is accessed subordinate to 'cccc'.
ERROR: The tables are related through a INDEPENDENT relationship.
ERROR: Consequently, non-PK FK Column 'column' in 'pppp' should ...
ERROR: inherit its value from the corresponding Column in pppp.
ERROR: Inheritance from source in pppp is invalid.

pppp is the long name of the Parent Data Table. cccc is the long name of the Child Data Table. column is the name of the Column in error. source is the name of the Column from which column is supposed to inherit its value. 'column' has an invalid source of inheritance. Use the appropriate design tool to attempt to define the source of the key inheritance and then try to re-analyze.

m030dt2043 f:
ERROR: A CHILD accessed subordinate to its PARENT through a DEPENDENT ...
ERROR: relationship should inherit its PK FK keys through that relationship.
ERROR: Consequently, PK FK Column 'column' in 'cccc' should ...
ERROR: inherit its value from the corresponding Column in pppp.
ERROR: No such inheritance is indicated.

pppp is the long name of the PARENT Data Table. cccc is the long name of the CHILD Data Table. column is the name of the Column in error. 'column' has no source of inheritance. This is invalid. Use the appropriate design tool to attempt to define the source of the key inheritance and then try to re-analyze.

m030dt2044 f:
ERROR: A CHILD accessed subordinate to its PARENT through an

INDEPENDENT ...
ERROR: relationship should inherit its FK keys through that relationship.
ERROR: Consequently, non-PK FK Column 'column' in 'cccc' should inherit its value ...
ERROR: inherit its value from the corresponding Column in pppp.
ERROR: No such inheritance is indicated.
pppp is the long name of the PARENT Data Table cccc is the long name of the Child Data Table column is the name of the Column in error 'column' has no source of inheritance. This is invalid. Use the appropriate design tool to attempt to define the source of the key inheritance and then try to re-analyze.

m030dt2045 f:
ERROR: Column 'column' in 'tttt' cannot inherit its value.
ERROR: A NON-FK Column, 'column', cannot have a source of inheritance.
tttt is the long name of the Data Table column is the name of the Column in error 'column' has a source of inheritance. This is invalid for a Column that is neither a PK nor a FK. Use the appropriate design tool to attempt to define the source of the key inheritance and then try to re-analyze.

m030dt2046 f:
ERROR: Column 'column' in 'tttt' cannot inherit its value.
ERROR: Invalid source of inheritance for 'column'.
tttt is the long name of the Data Table column is the name of the Column in error 'column' has a source of inheritance. This is invalid for a Column in a Data Table that is the first Data Table in the input/output hierarchy. Use the appropriate design tool to attempt to define the source of the key inheritance and then try to re-analyze.

FILE RULES (1-1999)

RULE: A File/DB must have a valid access method.

The Code Generators are set up to generate code to handle file access for certain types of DBMS. The access method in the File instance Record must be a known value e.g. VSAM, DB2 etc.

RULE: A File may have one or more Record types.

RULE: A File may have one or more VIEWs.

RULE: A File may have one or more TRANSACTIONs.

LOGICAL STRUCTURE ERRORS (2000-3999)

These error messages should only appear if a store of a Record, Screen etc. fails. These messages will normally be preceded by a set of messages that identify corrupt data. Those messages will also identify which phase of Analyze detected the problem.

GLOSSARY

'physical object' is used as a generic term for Screen, Transaction, Record, report etcetera.

'Logical Structure' refers to hierarchy of Data Tables that are used to define a physical object.

RELATE NODE is the relationship node defined on an INCA Information Model (IM) diagram.

FROM ARC is used to represent the connection from a Data Table to a RELATE NODE.

TO ARC is used to represent the connection from a RELATE NODE to a Data Table.

m030ls2001 f:
ERROR: Every Input/Output (I/O) node must have an associated Logical Structure.
Every physical object must be associated with at least one Data Table. The current physical object has no related Data Tables. Load the appropriate Design tool to rebuild the object.

m030ls2002 f:
ERROR: A Logical Structure Node should NOT have a null subordinate pointer.
This may happen if there is insufficient memory to allocate the subordinate structure. If a memory allocation failed then try to reduce the number of tools that are loaded and then attempt to re-run Analyze.

m030ls2003 f:
ERROR: A Logical Structure Node MUST have an associated DATA structure.
This may happen if there is insufficient memory to allocate the DATA structure. If a memory allocation failed then try to reduce the number of tools that are loaded and then attempt to re-run Analyze.

m030ls2004 f:
ERROR: The first Logical Structure in a hierarchy CANNOT have a 'from'
ERROR: Logical Structure.
This message is preceded by a 'corrupt data' message that the Logical Structure in the database that is corrupt. The hierarchy of Data Tables that define the physical object is corrupt. The first Data Table in the hierarchy cannot have a superior Data Table nor can be brought into the hierarchy with any inheritance information. Load the appropriate Design tool to rebuild the object.

m030ls2005 f:
ERROR: FROM ARC for Logical Structure is inconsistent.
ERROR: FROM ARC in Logical Structure = (k0, k1, k2, k3)
ERROR: FROM ARC points to: (k0', k1', k2', k3')
The Logical Structure has been incorrectly loaded. Load the appropriate Design tool to rebuild the object.

m030ls2006 f:
ERROR: TO ARC for Logical Structure is inconsistent.
ERROR: TO ARC in Logical Structure = (k0, k1, k2, k3)
ERROR: TO ARC points to: (k0', k1', k2', k3')
(k0, k1, k2, k3) is the key for the TO ARC in the Logical Structure. (k0', k1', k2', k3') is the key for the TO ARC in the TO ARC node in memory. The Logical Structure has been incorrectly loaded. Load the appropriate Design tool to rebuild the object.

m030ls2007 f:
ERROR: Logical Structure references mis-matched FROM ARC and TO ARCs!
ERROR: FROM ARC = (f0, f1, f2, f3)
ERROR: RELNODE = (r0, r1, r2, r3)
ERROR: TO ARC = (t0, t1, t2, t3)
(f0, f1, f2, f3) is the key for the FROM ARC in the Logical Structure. (r0, r1, r2, r3) is the key for the relnode that is associated with the FROM ARC. (t0, t1, t2, t3) is the key for the TO ARC in the Logical Structure. The Logical Structure is corrupt. The FROM ARC and the TO ARC are not associated with the SAME relnode. This is illogical. This may mean that the IM diagram has become corrupt.

m030ls2008 f:
ERROR: Inconsistent FOLD information.
ERROR: Superior DT = (d0, d1, d2, d3)
ERROR: TO ARC references DT (t0, t1, t2, t3)
ERROR: FOLD is flagged as CHILD->PARENT direction!
(d0, d1, d2, d3) is the key for the Data Table in the Logical Structure. (t0, t1, t2, t3) is the key for the TO ARC in the Logical Structure. The Logical Structure is corrupt. Load the appropriate Design tool to rebuild the object.

m030ls2009 f:
ERROR: Inconsistent FOLD information.");
ERROR: FOLD is flagged as PARENT->CHILD direction!");
ERROR: Superior DT = (d0, d1, d2, d3)

ERROR: TO ARC references DT (d0', d1', d2', d3')
(d0, d1, d2, d3) is the key for the Data Table in the Logical Structure. (d0', d1', d2', d3') is the key for the Data Table referenced by the TO ARC. The Logical Structure is corrupt. Load the appropriate Design tool to rebuild the object.

m030ls2010 f:
ERROR: Inconsistent FOLD information.

ERROR: FOLD is flagged as PARENT->CHILD direction!
ERROR: Superior DT = (d0, d1, d2, d3)
ERROR: TO ARC references DT (d0', d1', d2', d3')

(d0, d1, d2, d3) is the key for the Data Table in the Logical Structure. (d0', d1', d2', d3') is the key for the Data Table referenced by the TO ARC. The Logical Structure is corrupt. Load the appropriate Design tool to rebuild the object.

m030ls2011 f:

ERROR: The first Logical Structure in a hierarchy CANNOT have a superior
ERROR:   Logical Structure.

The Logical Structure is corrupt. Load the appropriate Design tool to rebuild the object.

m030ls2012 f:

ERROR: The first Logical Structure in a hierarchy CANNOT have a superior ERROR: Logical Structure.

The Logical Structure is corrupt. Load the appropriate Design tool to rebuild the object.

m030ls2013 f:

ERROR: At least one column from each Data Table in a Logical Structure
ERROR:   MUST participate, actively or passively, in the Logical
ERROR:   definition.
ERROR: Data Table has no participating columns.

The Logical Structure is corrupt. There MUST be at least one Included Column for every Data Table that participates in the definition of the physical object. If this is not the case, then the Data Table serves no useful purpose in the definition of the physical object. Load the appropriate Design tool to rebuild the object.

I/O AND OTHER ERRORS (1-1999)

These messages will normally be preceded by a set of messages that identify corrupt data. Those messages will also identify which phase of Analyze detected the problem.

m030io2001 f:
ERROR: This invention does not support a structure whose
ERROR: dimension is greater than 3.
ERROR: tttt 'llll' has dimension greater than 3.

tttt is the type of object that is in error. llll is the name of the object in error. The code generated does not support more than three (3) subscripts. The Design tools should not let a Systems Engineer (SE) build an object that requires more than 3 subscripts.

m030io2002 f:
ERROR: Inconsistent repetition factors on tttt PHYSICAL MAP!
ERROR: 'mmmm' has a repeat count of r1.
ERROR: This is not consistent with other PHYSICAL MAPs that also ...
ERROR: ... contain information for DATA TABLE 'dddd'

ERROR: ... but which have a repeat count of r2.

tttt is the type of MAP that is in error. mmmm is the name of the MAP in error. dddd is the lonmg name of the data table . r1   is the repeat count for the current MAP.  r2  is the repeat count for a previous MAP. This message indicates that the physical definition has become corrupt. A screen etc cannot have r1 occurences of column1 but r2 occurences of column2 if both column1 and column2 are associated with the SAME data table. Use the appropriate Design tool to modify the screen etc and then try to re-analyze the process.

m030io2003 f:
ERROR: Unbalanced parens found in I/O constraints.
ERROR: Too many close parentheses found.
Analyze has detected an inconsistency in the constraints for the current data table. Examine the I/O RULES that have been added for all of the data tables for the current process. Look for unmatched parentheses.

m030io2004 f:
ERROR: Unbalanced parens found in I/O constraints.
ERROR: Too many open parentheses found.
Analyze has detected an inconsistency in the constraints for the current data table. Examine the I/O RULES that have been added for all of the data tables for the current process. Look for unmatched parentheses.

m030io2005 f:
ERROR: Possible failure detected in the subscript analysis for DT 'dddd'.
ERROR: This can happen if ALL fields associated with the data table are suppressed.
ERROR: Please check the PROCESS definition and correct.
This message is most likely to appear when analyzing a screen. The subscript analysis is driven by analyzing the fields in the physical map(s). The given data table has none. However, the SE has specified that multiple rows are to be retrieved. Use the appropriate Design to include at least one field.

m030io2006 f:
ERROR: ALL NO NULLS COLUMNS must be well-defined when INSERTING a row.
ERROR: data table dddd (b) has an access intent of INSERT for action mode 'a'.
ERROR: The following COLUMN(s) are not active :-
* column list here *
To guarantee that the IM model is not violated, this invention demands that all NO NULLS COLUMNs be defined when an insert of a row is specified. One or more columns for the given data table are not defined for the current process. Use the appropriate Design to modify the process definition.

m030io2007 f:
ERROR: Primary key component for DATA TABLE dddd
ERROR: is a System Assigned key BUT it has a LITERAL constraint.
* column details here *
It is illogical for a column that is system assigned to have a literal constraint. Use the appropriate Design to modify the process definition.

m030io2008 f:
ERROR: Inconsistent PK constraints detected for DATA TABLE dddd
ERROR: A GENERIC READ is requested but the DT has tightly constrained PK components.
dddd is the long name of the data table. It is illogical for a data table to have ALL key components tightly constrained (i.e. constrained by equality constraints) and expect multipe rows of that data table to be retrieved. Use the appropriate Design to modify the process definition.

m030io2009 f:
ERROR: Inconsistent PK constraints detected for DATA TABLE dddd
ERROR: A SPECIFIC READ is requested but the DT has loosely constrained PK components.
dddd is the long name of the data table. It is illogical for a data table to have one or more key components loosely constrained or be unconstrained and expect to access a specific row of that data table. Use the appropriate Design to modify the process definition.

m030io2010 f:
ERROR: A PRIMARY KEY component that is referenced in an ORDER BY clause ...
ERROR: must be constrained.
ERROR: The following COLUMN:
* column information here 
ERROR: in DATA TABLE 'dddd' is unconstrained.
dddd is the long name of the data table. For order by clauses that comprise two or more fields the selection criteria for the rows to be selected have to reflect the order in which the rows are to be presented. To transform the constraints properly, this invention requires that all columns that participate in the order by clause be constrained. Use the appropriate Design to modify the process definition.

m030io2011 f:
ERROR: A DATA TABLE attribute that is referenced in an ORDER BY clause ....
ERROR: must be constrained.
ERROR: The following COLUMN:
* column information here 
ERROR: in DATA TABLE 'dddd' is unconstrained.

dddd is the long name of the data table. For order by clauses that comprise two or more fields the selection criteria for the rows to be selected have to reflect the order in which the rows are to be presented. To transform the constraints properly, this invention requires that all columns that participate in the order by clause be constrained. Use the appropriate Design to modify the process definition.

m030io2012 f:
ERROR: Order-by chain has an invalid sequence.
ERROR: First order-by clause should have a sequence number of ONE.
ERROR: First order-by clause has a sequence number of s ...
ERROR: for DATA TABLE dddd (b) in action mode number 'a'
dddd is the long name of the data table. "s" is the sequence number of the order by component a is the current action mode. The order by clause is corrupt. Use the appropriate Design to modify the process definition.

m030io2013 f:
ERROR: Order-by chain has an invalid sequence ...
ERROR: for DATA TABLE dddd (b) in action mode number 'a'
ERROR: Order-by chain should have contiguous sequence numbers.
ERROR: Previous order-by clause has a sequence number of s1.
ERROR: HOWEVER Current order-by clause has a sequence number of s2.
dddd is the long name of the data table. s1 and s2 are the sequence number of the order by components. "a" is the current action mode. The order by clause is corrupt. Use the appropriate Design to modify the process definition.

m030io2014 f:
ERROR: Order-by constraints are invalid in action mode 'a' ...
ERROR:    ... for DATA TABLE dddd (b).
ERROR: The FILE 'ffff' will be accessed to retrieve the data ...
ERROR:    for DATA TABLE 'dddd'.
ERROR: The FILE is serviced by 'dbms'.
ERROR: ASCENDING is the only sequence we can support for this file.
dddd is the long name of the data table. ffff is the long name of the application file. dbms is the DBMS that services the given FILE. a is the current action mode.The named DBMS does not support descending sequencing and the Code Generators cannot generate code to present the data in the requested order. Use the appropriate Design to modify the process definition.

m030io2015 f:
ERROR: Order-by constraints are invalid in action mode 'a' ...
ERROR:    ... for DATA TABLE dddd (b).
ERROR: The FILE 'ffff' will be accessed to retrieve the data ...
ERROR:    for DATA TABLE 'dddd'.
ERROR: The FILE is serviced by 'dbms'.
ERROR: Only PK components can be used to constrain the order
ERROR:    ... for accessing data from this file.
ERROR: You may want to consider an ALTERNATE INDEX to allow retrieval ...
ERROR:    ... of the required data in the requested sequence.

dddd is the long name of the data table. ffff is the long name of the application file. dbms is the DBMS that services the given file. a is the current action mode. The named DBMS does not explicitly support an order by clause and the Code Generators cannot generate code to present the data in the requested order. Use the appropriate Design to modify the process definition.

m030io2016 f:
ERROR: Order-by constraints are invalid in action mode 'a' ...
ERROR: ... for DATA TABLE dddd (b).
ERROR: The FILE 'ffff' will be accessed to retrieve the data ...
ERROR: for DATA TABLE 'dddd'.
ERROR: The FILE is serviced by 'dbms'.
ERROR: The RECORDs will be retrieved in PK sequence.
ERROR: You may want to consider an ALTERNATE INDEX to allow retrieval ...
ERROR: ... of the required data in the requested sequence.
dddd is the long name of the data table. ffff is the long name of the application file. dbms is the DBMS that services the given file. a is the current action mode. The named DBMS does not explicitly support an order by clause and the Code Generators cannot generate code to present the data in the requested order. Use the appropriate Design to modify the process definition.

I/O AND OTHER WARNINGS (4000-5999)

m030io4001 w:
WARNING: ALL NO NULLS COLUMNS must be well-defined when INSERTING a row.
WARNING: DATA TABLE dddd (b) has an access intent of ALL for action mode 'a'.
WARNING: INSERTs will NOT be supported because the following COLUMNS are not active :-
* column list here 
dddd is the long name of the data table. " a" is the current action mode. To guarantee that the IM model is not violated, this invention demands that all NO NULLS COLUMNs be defined when an Insert of a row is specified. One or more columns for the given data table are not defined for the current process. Since the given data table has dynamic access intents Analyze will suppress Insert mode for the given action mode but will allow the other access intents. Use the appropriate Design to modify the process definition if Insert is required.

PROCESS RULES (1-1999)

RULE: A PROCESS must be defined before analysis.
ERROR: ... PROCESS with instance id ppppp not defined.
The Analyze tool was called to analyze a non-existent process. The value ppppp in the accompanying error message identifies the PROCESS key that was passed to Analyze.

RULE: A PROCESS must be subordinate to a System or SUB-System.
ERROR: ... no such connection for PROCESS, pr_name.
The value pr-name in the accompanying error message identifies the process that has no parent System or SUB-System. Use SCC to connect the process to a valid parent.

RULE: A PROCESS must be (in)directly subordinate to a System.
ERROR: ... no System found for PROCESS, pr_name.
The value pr-name in the accompanying error message identifies the process that has no superior System. Use SCC to ensure the process has a superior System.

RULE: A Process must have an associated Screen, report or Transaction(S).
ERROR: ... the PROCESS, pr-name, has no associated entities.
The value pr-name in the accompanying error message identifies the process that has no associated Screen, report or Transaction. Use the appropriate Design Tool to attach the desired entity.

RULE: A Process cannot have multiple Screen(S) and/or Report(S) and Transaction(S).
ERROR: ... the PROCESS, pr-name, has multiple associated entities.
The value pr-name in the accompanying error message identifies the process that has multiple entities connected to it. Use SCC to view the entities connected to the process.

RULE: A Process may have a connection to a Record
Self-explanatory.

RULE: A Process may have a connection to a Structure
Self-explanatory.

RULE: A Process-to-Record connection type may be INPUT, OUTPUT,

RULE: or INPUT AND OUTPUT.
Self-explanatory.

REPORT RULES (1-1999)

m030rp0001 f:
RULE: A Report must be defined before analysis.
ERROR: ... the Report with instance id sssss is undefined.
The Analyze tool was called to analyze a non-existent Report. The value sssss in the accompanying error message identifies the Report key that was passed to Analyze.

m030rp0002 f:
RULE: Page size for Report must be specified.
ERROR: ... Report sss does not have a valid page size specified.
ERROR: ... PAGE SIZE is nnn X mm.
nnn represents the number of columns.
mm represents the number of rows.
The Report page size is either zero or out of bounds. The largest value for report columns is 132. There is no maximum value for report lines. Use Report Design to change the report page size.

m030rp0003 f:
RULE: A Report MUST have at least one field defined for it.
ERROR: ... No fields defined for report, 'sss'.
sss is the Report short name.
The report has no Modeled Fields nor Derived Fields defined for it. Therefore no data will be represented on the Report. This is illogical to the Analyze tool. Use Report Design to add fields.

m030rp0004 f:
RULE: A Report Sort key length MUST be within limits.
ERROR: ... Sort key length is greater than 50 bytes
ERROR: ... The sort key is nnn bytes long.
nnn is the sum of the lengths of the Fields in the sort key.
The sort key length has a physical limitation of 50 bytes. The Analyze tool will list the fields found in the sort key. Use Report Design to remove unnecessary fields from the sort key.

m030rp0005 f:
RULE: A Report Printline MUST have at least one field defined for it.
ERROR: ... Printline has no fields defined for it.
The printline indicated after the error message has no fields or labels defined for it. Therefore no data will be represented on the printline. This is illogical to the Analyze tool. Use Report Design to add a field to the printline.

m030rp0006 f:
RULE: A Report Printline MUST have a non-zero length.
ERROR: ... Printline has a length of ZERO.
The printline indicated after the error message has a zero length. Therefore no data will be represented on the printline. Use Report Design to add a field or label to the printline.

m030rp0007 f:
RULE: A Report Printline MUST have a valid report line type.
ERROR: ... Invalid or Undefined Component Map type.

ERROR: ... Component Map has a report line type of ttt.
ttt is the report line type of the Report PHYS MAP.
The Component map indicated after the error message has a report line type other than GRP. Use Report Design to change the report line type.

m030rp0008 f:
RULE: A Report Printline MUST have a valid report line type.
ERROR: ... Invalid Report line type for a Printline.
ERROR: ... Printline has Report line type of ttt.
ttt is the report line type of the printline. The printline indicated after the error message has a report line type other than HDR, DTL, or FTR. Use Report Design to change the report line type.

m030rp0009 f:
RULE: A Report Printline MUST have a repeat count of ONE.
ERROR: ... Printline has a repeat count of nnn.
nnn is the repeat count of the printline. The printline indicated after the error message is indicated as a repeating group. printlines are printed ONCE per set of data retrieved. printlines inherently repeat. Only Component maps can be repeating groups. Use Report Design to change the max occurs.

m030rp0010 f:
RULE: A Report Printline MUST have a valid carriage return.
ERROR: ... Invalid or Undefined Carriage return for Printline!
ERROR: ... Printline has a carriage return of nn.
nn is the carriage return value of the printline.
The printline indicated after the error message has a carriage return not recognized by the Analyze tool. Use Report Design to change the printline cc.

m030rp0011 f:
RULE: A Report Printline length CANNOT be greater than
RULE:     the number of columns specified for the report.
ERROR: ... Printline has length xx.
ERROR: ... WHEREAS the number of columns spec'd is yy.
The printline indicated after the error message has a length that will overflow the page boundaries. Use Report Design to edit the printline.

m030rp0012 f:
RULE: 'Print When Value Changes' only applies a modelled field that is
RULE:     in the sort key OR has its entire Primary Key in the sort key.
ERROR: ... Modelled field is not a valid candidate for 'Print When Value Changes'.
The Modeled field indicated after the error message is not uniquely defined by the sort key. Therefore WHEN to print the Modelled field is ambiguous. This is illogical to the Analyze tool. Use Report Design to edit the Modelled field.

m030rp0013 f:
RULE: 'Print When Value Changes' does NOT apply to a calculated field.

ERROR: ... A calculated field was encountered with 'print on change' attribute.
The Calculated field indicated after the error message is indicated for Print When Value Changes.
Use Report Design to edit the Calculated field.

m030rp0014 f:
RULE: A Report field source of SUM or AVG must be NUMERIC.
ERROR: ... Modelled field has data type of tt.
 The Modelled field indicated after the error message has a non-numeric source. A 'Use for Derive' with SUM or AVG was attemped on a Modelled field for a non-numeric Data Element. Numeric operations are invalid on Data Elements with a source of character or index.

m030rp0015 f:
RULE: A Report field source of SUM COUNT or AVG must break before
RULE: or at the same level as the result field.
ERROR: ... It doesn't make sense for a field whose level is xx
ERROR: ... to be used in the calculation of a field whose level is yy
The calculated field indicated after the error message has a deeper break level than the Modelled field on which it is based. Therefore, the calculated field will be printed before and more often than when its value is determined. Use Report design to edit the Calculated field.

m030rp0016 f:
RULE: A Report field source of SUM or AVG must have
RULE: a root field to be summed or averaged.
ERROR: ... Calculated field has no root field associated with it.
The Calculated field indicated after the error message does not have a target Included Column that matches a Modelled field on the Report.

m030rp0017 f:
RULE: A Report field with source of DATE requires data format C
RULE: and length of 8.
ERROR: ... Derived field has data type of t and length of nn.
The Derived field indicated after the error message has a source of date, but does not have a date format.

m030rp0018 f:
RULE: A Report field with source of TIME requires data format C
RULE: and length of 5.
ERROR: ... Derived field has data type of t and length of nn.
The Derived field indicated after the error message has a source of time but does not have a time format.

m030rp0019 f:
RULE: A Report field source of PAGE must be NUMERIC.
ERROR: ... Derived field has data type of t.
The Derived field indicated after the error message has a source of page but does not have a numeric format.

m030rp0020 f:
RULE: All Report fields must have a valid source specified.
ERROR: ... Invalid source specified for derived field!
The Derived field indicated after the error message has a source not recognized by the Analyze tool.

m030rp0021 f:
RULE: Headers must have a valid Report Break specified.
ERROR: ... Header has no Report Break specified.
The Header indicated after the error message does not have a break level specified. Use Report Design to assign a break level to the Header.

m030rp0022 f:
RULE: Headers must appear in Report Break sequence on a report.
ERROR: ... Header has a break level of xx
ERROR: ... and appears after break level yy.
The Header indicated after the error message is specified AFTER a printline that will be printed LATER in the processing than the Header. The order of the specification does not match the order of execution. Use Report Design to modify the printlines.

m030rp0023 f:
RULE: Only a Header can have 'print also on page break' attribute.
ERROR: ... Non-header printline encountered with print on page break attribute.
ERROR: ... Printline has a report line type of ttt.
The printline indicated after the error message has the 'print also on page break' attribute, but is not a Header. Use Report Design to modify the printlines.

m030rp0024 f:
RULE: Footers must have a valid Report Break specified.
ERROR: ... Footer has no Report Break specified.
The Footer indicated after the error message does not have a break level specified. Use Report Design to assign a break level to the Footer.

m030rp0025 f:
RULE: All Headers must appear BEFORE all Footers on a report.
ERROR: ... Footer xxx
ERROR: ... appears before Header yyy
The Footer indicated appears before the Header indicated, but will be printed after the Header. The order of the specification does not match the order of execution. Use Report Design to modify the printlines.

m030rp0026 f:
RULE: Footers must appear in Reverse Report Break sequence
RULE: on a report.
ERROR: ... Printline has a break level of xx
ERROR: ... and appears after break level yy
The Footer indicated after the error message is specified AFTER a printline that will be printed LATER in the processing than the Footer. The order of the specification does not match the order of execution. Use Report Design to modify the printlines.

m030rp0027 f:
RULE: Only the FIRST line of a control group can be assigned
RULE: an absolute line number.
ERROR: ... Printline is not the first line in its group.
The printline indicated after the error message has an absolute carriage control, but carriage control within a control group is relative to where the previous printlines have been printed. The Analyze tool cannot guarantee that the printline will always print at the specified line number. Use Report Design to modify the printline cc.

m030rp0028 f:
RULE: Next Group of PAGE on a page header would cause a print loop.
ERROR: ... Printline is page header with next group of PAGE.
The Header indicated after the error message is specified to print at the top of the next page then to push to the next page before printing the next group of printlines. The act of pushing to the next page will cause the Header printed again, beginning an infinite loop. Use Report Design to modify the printline cc.

m030rp0029 f:
RULE: The first page header must have a carriage return of
RULE: 'top of page' or literal.
ERROR: ... Page header encountered with carriage return of cc.
The Header indicated after the error message has a break indicator of PAGE and is the first in its group, but does not have a carriage return that pushes to the next page. Use Report Design to modify the printline cc.

m030rp0030 f:
RULE: There must be at least 1 DETAIL line on every report.
ERROR: ... Report sss has no print lines of type DETAIL.
The Report does not have any printlines of type DTL specified for it. Therefore, no data will be represented on the Report. This is illogical to the Analyze tool. Use Report Design to modify the Report.

m030rp0031 f:
RULE: Details must appear in Report Break sequence on a report.
ERROR: ... Printline has a break level of xx
ERROR: ... and appears after break level yy
  The Detail indicated after the error message is specified AFTER a printline that will be printed LATER in the processing than the Detail. The order of the specification does not match the order of execution. Use Report Design to modify the printlines.

m030rp0032 f:
RULE: A DETAIL printline cannot have a break level of Report.
ERROR: ... Detail printline encountered with break indicator of Report.
  The Detail indicated after the error message is specified to be printed on change of Report. Therefore only one Detail, (i.e. one set of data) will be printed for the Report. This is illogical to the Analyze tool. Use Report Design to modify the Detail printline.

m030rp0033 f:
RULE: A DETAIL printline cannot have a break level of BANNER.
ERROR: ... Detail printline encountered with break indicator of BANNER.
  The Detail indicated after the error message is specified to be printed on change of BANNER. Therefore only one Detail, (i.e. one set of data) will be printed for the BANNER. This is illogical to the Analyze tool. Use Report Design to modify the Detail printline.

m030rp0034 f:
RULE: Analyze cannot handle more than one group of 1:M accesses
ERROR: ... I cannot write an extract Record for an I/O chain that has
ERROR: ... more than one set of 1:m type accesses. Ask for help.
ERROR: ... The following two independent Data Tables have a
ERROR: ... 1:m io access call under the same superior.
  The Data TableS indicated are independent and are accessed many times for the same superior Data Table. Analyze cannot handle multiple browses such as described. Use Report Design and IM to re-specify the I/O path.

m030rp0035 f:
RULE: A Report cannot reference any included columns from a
RULE: Data Table with an access intent of ignore.
ERROR: ... The following sort key component references
ERROR: ... a Data Table with access intent of ignore.
  The sort key component indicated after the error message comes from a Data Table with an access intent of ignore. Since no data is retrieved from Data Tables with an access intent of ignore, a Report sort key that references a Data Table with this access intent is invalid. Use Report Design to modify the sort key or Data Table.

m030rp0036 f:
RULE: A derived field may only appear ONCE in a sort key sequence.
ERROR: ... Check the Key Sequence of Report Design and change
ERROR: ... the data elements on which the duplicate derived fields are based.
ERROR: ... The derived fields are: FFFF m030rp0037 f:
RULE: Derived field MUST be included in the sort key if it is to have the Print on change attribute.
ERROR: ... Derived field was not found in the sort key.
The Derived field indicated after the error message has the Print on change attribute, BUT is not in the sort key. This will result in unpredictable results during the execution of the report. Use Report Design to add the derived field to the sort key, or change the Print on change attribute for the Derived field.

m030rp0038 f:
RULE: When a printline does not break on the change of its uniquely qualifying sort key component, All of the printline's data MUST exist in the sort key OR the data's entire primary key MUST exist in the sort key.

ERROR: ... Analyze has determined that the following printline: MMMM
ERROR: ... has data that needs to be printed at the break level b1
ERROR: ... BUT the printline has a break level of b2
Analyze has detected the printline MMMM has data displayed on it that may change more often than it will be printed. This will have unpredictable results during the execution of the Report. Such results may be missed data. Analyze also indicates that the break level necessary for a logical execution is b1, but the break level assigned to the printline is b2. Use Report Design to change the break level of the printline, change the data in the printline, or change the sort key to uniquely identify the data in each printline.

m030rp0039 f:
RULE: When a printline does not break on the change of its
RULE: uniquely qualifying sort key component,
RULE: All of the printline's data MUST exist in the sort key
RULE: OR the data's entire primary key MUST exist in the sort key.
ERROR: ... The following printline or component map: MMMM
ERROR: ... Has the following field that is not uniquely qualified
ERROR: ... by the sort key.

The field indicated after the error message will have unpredictable data during the execution of the Report. Analyze has detected the printline MMMM has data displayed on it that may change more often than it will be printed. This will have unpredictable results during the execution of the Report. Such results may be missed data. Use Report Design to change the break level of the printline, change the data in the printline, or change the sort key to uniquely identify the data in each printline.

REPORT ERRORS (2000-3999)

The error codes given in this section reflect problems detected by Analyze. These messages may be preceded by a set of messages that identify corrupt data.

GLOSSARY

'Driver' refers to the Data Table that will be scanned first in the execution of the REPORT EXTRACTOR MODULE.

'component' refers to a Modeled Field, Derived Field, Label or Component Map contained in a printline.

COMPONENT MAP refers to a REPORT PHYS MAP that is contained in a printline.

EXTRACT MAP refers to the internal printline that represents a Dsect of all fields on the report.

Field refers to a Modeled Field or a Derived Field.

I/O TYPE is used to represent the connection from the I/O to the Report.

MDL SRT SEQ refers to a Modeled Field that is to be used in the sort of all extracted Records.

printline refers to a master REPORT PHYS MAP the 'stand alone' REPORT PHYS MAP that contains all COMPONENT MAPs, Fields and LABELs REPORT PHYS MAP is used to represent the connection from the Report to a AD18.

SORT MAP refers to the internal printline that representsa Dsect of all fields that will be used for the sort of all extracted records.

m030rp2000 f:

ERROR: Cannot find IO TYPE node for Report!
A problem was found when attempting to load the IO->RP relate. Contact your cluster administrator. Use Report Design to connect the PROCESS, I/O and Report correctly.

m030rp2001 f:
ERROR: Auto code gen flag is off.
This Report is not indicated for automatic code generation. Therefore, Analyze will not validate nor generate code for this report. Use the Report definition to change the auto code gen flag of the report.

m030rp2002 f:
ERROR: Wrong NODE type - MDL SRT SEQ expected.
ERROR: Sequence node has type tttt.
Analyze has detected corrupt data. The MDL SRT SEQ does not have the expected node type. The node type tttt was encountered instead.

m030rp2003 f:
ERROR: Cannot build EXTRACT MAP! - call SE.
Analyze was unable to build a PHYS MAP for the extract record. This may happen if there is insufficient memory to allocate the EXTRACT MAP. If a memory allocation failed then try to reduce the number of tools that are loaded and then attempt to re-run Analyze.

m030rp2004 f:
ERROR: Bad node type. A printline - of type PHYS MAP and no superior - was expected.
ERROR: Node encountered has type tttt.
Analyze has detected corrupt data. The Printline does not have the expected node type. The node type tttt was encountered instead.

m030rp2005 f:
ERROR: EXTRACT MAP is NULL!- call SE.
Analyze was unable to build a the EXTRACT MAP successfully. This may happen if there is insufficient memory to allocate the EXTRACT MAP. If a memory allocation failed then try to reduce the number of tools that are loaded and then attempt to re-run Analyze.

m030rp2006 f:
ERROR: EXTRACT MAP has no children! - call SE.
Analyze was unable to build a the EXTRACT MAP successfully. This may happen if there is insufficient memory to allocate the EXTRACT MAP. If a memory allocation failed then try to reduce the number of tools that are loaded and then attempt to re-run Analyze.

m030rp2007 f:

ERROR: The Driver Data Table indicated for scan has an access intent of ignore.
ERROR: The I/O path indicates multiple Data Tables are to be read subordinate
ERROR: to the Driver Data Table.
ERROR: Analyze Cannot determine which Data Table to scan.
Analyze has detected that no data is to be retrieved from the Driver Data Table (the table to be scanned). Analyze has tried to assign a different Data Table to be the Driver, but there is more than one choice. Use Report Design to take the ignore access intent off the Data Table, or redefine the I/O access path by destroying the Report and reselecting the Data TableS in the IM tool.

m030rp2008 f:
ERROR: All data tables have an access_intent of ignore.
ERROR: NO records will be extracted for this report
ERROR: because NO tables have been selected for I/O.
Analyze has detected that no data is to be retrieved from the Data Tables because that all have and access intent of ignore. Use Report Design to modify the access intents of the selected Data TableS.

m030rp2009 f:
ERROR: Cannot build SORT MAP! -- Call SE.
Analyze was unable to build a PHYS MAP for the SORT record. This may happen if there is insufficient memory to allocate the SORT MAP. If a memory allocation failed then try to reduce the number of tools that are loaded and then attempt to re-run Analyze.

m030rp2010 f:
ERROR: Wrong NODE type - MODEL_Field or DERIVED_Field expected.
ERROR: Field has a bad node type of tttt Analyze has detected corrupt data. The Field does not have the expected node type. The node type tttt was encountered instead. Use GRM to reconcile this problem.

m030rp2011 f:
ERROR: Wrong NODE type - printline_MAP, MODEL_Field, DERIVED_Field or LABEL expected.
ERROR: Print line component has bad node type of tttt.
Analyze has detected corrupt data. The Print line component does not have the expected node type. The node type tttt was encountered instead.

m030rp2012 f:
ERROR: Cannot rearrange SORT MAP! - Call SE.
Analyze was unable to change the order of the components in the SORT record. This may happen if there is insufficient memory to allocate the SORT MAP. If a memory allocation failed then try to reduce the number of tools that are loaded and then attempt to re-run Analyze.

m030rp2013 f:
ERROR: Error inserting field into SORT MAP! - Call SE.
Analyze was unable to insert a SORT record component. This may happen if there is insufficient memory to allocate the SORT MAP. Check your console for such messages. If a memory allocation failed then try to reduce the number of tools that are loaded and then attempt to re-run Analyze.

m030rp2014 f:
ERROR: The row location for this Modeled Field (r1) does NOT match
ERROR: The row location for its printline (r2).
Analyze has detected corrupt data. The Modeled Field's data indicates that it belongs in the printline at row location (r1), BUT the printline of which it is a component is located at row (r2). Either the Modeled Field's data is wrong or the Report PHYS MAP chain is wrong. Use GRM to reconcile this problem.

m030rp2015 f:
ERROR: The row location for this DERIVED Field (r1) does NOT match
ERROR: The row location for its printline (r2).
Analyze has detected corrupt data. The DERIVED Field's data indicates that it belongs in the printline at row location (r1), BUT the printline of which it is a component is located at row (r2). Either the Derived Field's data is wrong or the Report PHYS MAP chain is wrong. Use GRM to reconcile this problem.

m030rp2016 f:
ERROR: The row location for this LABEL (r1) does NOT match
ERROR: The row location for its printline (r2).

Analyze has detected corrupt data. The LABLE's data indicates that it belongs in the printline at row location (r1), BUT the printline of which it is a component is located at row (r2). Either the LABEL's data is wrong or the Report PHYS MAP chain is wrong. Use GRM to reconcile this problem.

m030rp2017 f:
ERROR: Field cannot be found in EXTRACT map! - Call SE.
Analyze has detected corrupt data. The EXTRACT MAP does not contain all Fields on the report. All Fields on the Report MUST be represented in the EXTRACT MAP. This may happen if there is insufficient memory to allocate the EXTRACT MAP. If a memory allocation failed then try to reduce the number of tools that are loaded and then attempt to re-run Analyze.

m030rp2018 f:
ERROR: Error inserting Field into EXTRACT MAP! - Call SE.
Analyze was unable to insert a EXTRACT record component. This may happen if there is insufficient memory to allocate the EXTRACT MAP. If a memory allocation failed then try to reduce the number of tools that are loaded and then attempt to re-run Analyze.

m030rp2019 f:
ERROR: Detail printline has invalid break level.
The printline indicated after the error message does not have a valid break level. This will cause unpredictable results in the execution of the Report. Use the Report Design to change the Printline's break level.

m030rp2020 f:
ERROR: Report has no data!
This may happen if there is insufficient memory to allocate the DATA structure. If a memory allocation failed then try to reduce the number of tools that are loaded and then attempt to re-run Analyze.

m030rp2021 f:
ERROR: Report does not have a substructure!
This may happen if there is insufficient memory to allocate the subordinate structure. If a memory allocation failed then try to reduce the number of tools that are loaded and then attempt to re-run Analyze.

m030rp2022 f:
ERROR: No Access Intent defined for Report!
Every Report must have an I/O Access Intent. Load Report Design to rebuild the Report.

m030rp2023 f:

ERROR: No printlines defined for Report!
Every Report must have at least one printline defined for it. Load Report Design to rebuild the object.

m030rp2024 f:
ERROR: SORT SEQUENCE has no data!
This may happen if there is insufficient memory to allocate the DATA structure. If a memory allocation failed then try to reduce the number of tools that are loaded and then attempt to re-run Analyze.

m030rp2025 f:
ERROR: SORT SEQUENCE does not have a substructure!
This may happen if there is insufficient memory to allocate the subordinate structure. If a memory allocation failed then try to reduce the number of tools that are loaded and then attempt to re-run Analyze.

m030rp2026 f:
ERROR: Field has no data portion from which to get its length.
This may happen if there is insufficient memory to allocate the DATA structure. If a memory allocation failed then try to reduce the number of tools that are loaded and then attempt to re-run Analyze.

m030rp2027 f:
ERROR: printline found with no components.
Every printline must have Fields or LABELs defined for it. Load Report Design to rebuild the object.

m030rp2028 f:
ERROR: printline does not have any children!
Every printline must have Fields or LABELs defined for it. Load Report Design to rebuild the object.

m030rp2030 f:
ERROR: COMPONENT MAP node has no data!
This may happen if there is insufficient memory to allocate the DATA structure. If a memory allocation failed then try to reduce the number of tools that are loaded and then attempt to re-run Analyze.

m030rp2031 f:
ERROR: COMPONENT MAP node has no substructure!
This may happen if there is insufficient memory to allocate the subordinate structure. If a memory allocation failed then try to reduce the number of tools that are loaded and then attempt to re-run Analyze.

m030rp2032 f:
ERROR: LABEL has no data!
This may happen if there is insufficient memory to allocate the DATA structure. If a memory allocation failed then try to reduce the number of tools that are loaded and then attempt to re-run Analyze.

m030rp2033 f:
ERROR: EXTRACT MAP cannot be built! - Call SE.

Analyze was unable to build the EXTRACT record. This may happen if there is insufficient memory to allocate the EXTRACT MAP. If a memory allocation failed then try to reduce the number of tools that are loaded and then attempt to re-run Analyze.

m030rp2034 f:
ERROR: Report PHYS MAP does not have any data!
This may happen if there is insufficient memory to allocate the DATA structure. If a memory allocation failed then try to reduce the number of tools that are loaded and then attempt to re-run Analyze.

m030rp2035 f:
ERROR: HEADING LABEL does not have a substructure!
This may happen if there is insufficient memory to allocate the subordinate structure. If a memory allocation failed then try to reduce the number of tools that are loaded and then attempt to re-run Analyze.

m030rp2036 f:
ERROR: HEADING LABEL is not connected to a LABEL!!
Analyze has detected corrupt data. Every HEADING LABEL for a Field must have a LABEL target. Load Report Design to rebuild the object.

REPORT WARNINGS (4000-5999)

m030rp4001 w:
WARNING: The File SCAN Supervisor CANNOT scan an IGNORED Data Table.
WARNING: Therefore ANALYZE has set the Data Table to be scanned
WARNING: to be 'ssss'.
ssss is the short name of the Data Table. Analyze has changed the I/O path to scan the Data Table 'ssss'. If this is not desired, then use Report Design to redefine the I/O path, or modify the Data Table to NOT have the ignore attribute.

m030rp4002 w:
WARNING: The EXTRACTOR CANNOT scan an IGNORED Data Table.
WARNING: Therefore ANALYZE has set the Data Table to be scanned
WARNING: to be 'sss'.
ssss is the short name of the Data Table. Analyze has changed the I/O path to scan the Data Table 'ssss'. If this is not desired, use Report Design to redefine the I/O path, or modify the Data Table to not have the ignore attribute.

m030rp4003 w:

WARNING: Printline max repeat is zero.
WARNING: Setting default max repeat to 1.
Analyze has changed the max repeat count for the printline to be defaulted to 1 (ONE). This may happen when the printline's data is not initialized.

m030rp4004 w:
WARNING: Derived fields were encountered on the report that
WARNING: are based on the same data element. Analyze will
WARNING: treat ALL of the duplicate derived fields as synonyms.
WARNING: That is, there will be ONE field in the extract Dsect
WARNING: to represent the data element.
WARNING: If this is NOT desired, change the data elements
WARNING: on which the duplicate derived fields are based.
WARNING: The derived fields are: DDDD
DDDD represents the DERIVED Fields that are based on the same Data Element. The DERIVED Fields can be changed.

m030rp4005 w:
WARNING: Analyze currently does not handle Footers
WARNING: with next group carriage control.
WARNING: Ignoring specified carriage control for next group.
The data of the Footer printline shows that a next group carriage control is specified. Analyze will ignore next group carriage control for Footer printlines. Determine another way to obtain the same spacing results m030rp4006 w:
WARNING: Analyze cannot verify that this printline   printline_MAP
WARNING: has a logical break level because the break corresponds
WARNING: to a derived field in the sort key. SORT_KEY_COMPONENT
Analyze is letting you hang yourself. Since a DERIVED Field is not a part of the IM. Analyze cannot determine whether or not the execution of the Report will bring unpredictable results. If you are sure that this is the correct sort sequence, continue.

m030rp4007 w:
WARNING: PHYS MAP max repeat is zero.
WARNING: Setting default max repeat to 1.
Analyze has changed the max repeat count for the phys map to be defaulted to 1 (ONE). This may happen when the PHYS MAP's data is not initialized.

REPORT INFORMATION MESSAGES (6000-7999)

These messages below are for the SE to note as valuable information about the REPORT.

m030rp6000 i:
PAGE SIZE is nnn X mm
nnn is the number of columns on a page for this REPORT.
mm is the number of lines on a page for this REPORT.

This information is valuable during the execution of the REPORT. The number of columns indicates the page width, and the number of lines indicates when a new page is needed.

m030rp6001 i:
DRIVER RECORD: rrr
DRIVER FILE : ff rrr is the short name of the record that will be scanned during data extraction. ff is the short name of the file that will be scanned during data extraction.In a VSAM environment, the Driver Record will be read by the File Scan supervisor and handed to the Extractor module. In any other environment, the Extractor module will read the Driver Record itself.In a VSAM environment, the Driver File must be added to the System Control File when scheduling the Report for the File Scan supervisor.

RULESET RULES (1-1999)

Ruleset Glossary

'actual parameter' refers to the Field on the physical object or in the Record that is to be substituted for a Derived Data Column when the rule is used for this physical object.

'constraint RULE' refers to a User defined rule built by clicking on I/O rule in the appropriate design tool. It is so called because an I/O RULE adds addtional constraints to the records being read.

'physical object' is used as a generic term for Screen, Transaction, Record, Report etcetera.

Derived Data Column refers to a Data Table Column whose value is not given by the user, but defined by a rule.

EXPRESSION refers to any combination of terms for the Right hand side of an assignment statement allowed by Code Window. In the case of Derived Data Columns, the expression may only reference Columns and literalss.

MODIFIABLE means the user can change the value of a Field on a physical object.

m030rs0001 f:
RULE: EVERY derived data column in a Data Table must have
RULE:   an associated rule.
ERROR: ... A derived data column was encountered with NULL rules.

The Column indicated after the error message has been designated as a Derived Data Column (that is, its value must be calculated or derived). BUT, the RULE that defines the calculation to be done for the Derived Data Column is not present Use the IM tool to add the Column RULE.

m030rs0002 f:
RULE: EVERY derived data column in a Data Table must have only
RULE: ONE rule associated with it.
ERROR: ... A derived data column was encountered with more that one rule.

m030rs0003 f:
RULE: A RULE for a derived data PK column may NOT reference other
RULE: derived data columns.
ERROR: ... The Rule for this column: CCCC1
ERROR: ... Contains references to another column: CCCC2
 CCCC1 refers to the Derived Data Column that is a PK. CCCC2 refers to the Derived Data Column referenced by the PK Derived Data Column Rule.The Derived Data Column CCCC1 is also a Primary Key (PK). Since a PK is a 'No Changes' Column, the Rule for a PK cannot reference other ColumnS such as CCCC2 because their value is NOT 'No Changes' and could alter the value of the PK Derived Data Column. Use the IM tool to change the Rule for the PK Derived Data Column.

m030rs0004 f:
RULE: A RULE for a Data Table column MUST reference either columns or literals.
ERROR: ... No column node found for key.
Analyze has detected corrupt data. A Column Rule may only manipulate ColumnS and LITERALS. The Rule either references a Column that no longer exists, OR the Rule data is corrupt.Use the IM tool to correct the Rule.

m030rs0005 f:
RULE: A RULE for a derived data column MUST have an actual parameter.
ERROR: ... There is no actual parameter for the derived data column.
Analyze could not find a Field to substitute for the Derived Data Column on the object (ie. Report, Screen, Tmasaction) being analyzed. Load the appropriate Design tool to rebuild the object.

m030rs0006 f:
RULE: A derived data column in a Data Table may NOT be MODIFIABLE.
ERROR: ... This derived data column is flagged as being MODIFIABLE.
The value for a Derived Data Column is determined by the Column Rule, therefore it is illogical to allow the Column to be modifiable on a Screen, Transaction, etc. Load the appropriate Design tool to rebuild the object.

m030rs0007 f:
RULE: EVERY derived data column in a Data Table must have an associated rule.
ERROR: ... The following column has no rule:
The Column indicated after the error message has been designated as a Derived Data Column (that is, its value must be calculated or derived). BUT, the Rule that defines the calculation to be done for the Derived Data Column is not present Use the IM tool to add the Column Rule.

m030rs0008 f:
RULE: A RULE for a derived data column MUST be an assignment rule with the left hand side being the target column of the Rule.
ERROR: ... Parameter list indicates that the lhs is not the column for which this Rule is intended or the parameter list is NULL.
A Derived Data Column must have a Rule that defines how to obtain the Column's value. The Rule must be in the form: Derived Data Column is assigned expression. Analyze has detected that the left hand side of the assignment statement is NOT the Derived Data Column. Use the IM tool to correct the Derived Data Column Rule.

m030rs0009 f:
RULE: A RULE for a derived data column may NOT be defined in terms of itself.
DT_COLUMN: CCCC1is referenced by the rule for
DT_COLUMN: CCCC2is referenced by the rule for
DT_COLUMN: etc.is referenced by the rule for
DT_COLUMN: CCCC1
CCCC1 is the Derived Data Column that has the circular definition. CCCC2, etc. are the intermediate Derived Data Columnss. Analyze has detected a circular definition in which a Derived Data COLUMN1 is defined by other Derived Data Columnss which in turn are defined by Derived Data COLUMN1 again. Use the IM tool to correct the Derived Data Column rules.

m030rs0010 f:
RULE: EVERY non-derived data column in a Data Table must have a
RULE: HOME location once that Data Table is mapped onto Record(s).
Analyze has found a Column Rule that references a Column that does not have a HOME location. Use the IM tool to remove the offending Column reference from the Rule, or use the Record Design tool to create a home location for the Column.

m030rs0011 f:
RULE: Left hand side of Constraint MUST be a valid included column.
ERROR: ... No key found for Left hand side of constraint.
The constraint Rule following the error message has a bad Left hand side. Either the Left hand side has a literal or the data portion is corrupt. Use the appropriate design tool to change the I/O Rule definition.

m030rs0012 f:
RULE: Left hand side of Constraint MUST be a valid included column.
ERROR: ... No valid included column found for Left hand side of constraint.
The constraint Rule following the error message has a bad Left hand side. Either the Left hand side references an INCLUDED Column that no longer exists or the data portion is corrupt. Use the appropriate design tool to change the I/O Rule definition.

m030rs0013 f:
RULE: Right hand side of constraint MUST be a valid included column,
RULE: command line field, or literal.

The constraint Rule following the error message has a bad Right hand side. Either the Right hand side references an entity that no longer exists or the data portion is corrupt. Use the appropriate design tool to change the I/O Rule definition.

m030rs0014 f:
RULE: Right hand side of constraint MUST be a valid included column, command line field, or literal.
ERROR: ... Right hand side of constraint is not a valid included column or literal.
This message occurs when a command line field is not applicable to the validation of a constraint Rule (that is, when the object being analyzed is not a Screen). The constraint Rule following the error message has a bad Right hand side. Either the Right hand side references an entity that no longer exists or the data portion is corrupt. Use the appropriate design tool to change the I/O Rule definition.

m030rs0015 f:
RULE: The Left hand side of a constraint CANNOT be a derived column.
ERROR: ... A derived column was encountered for the constraint.
The constraint Rule following the error message has a bad Left hand side. A Derived Data Column does not have a value on the READ. Therefore, it is illogical to use a Derived Data Column in a constraint Rule. Use the appropriate design tool to change the I/O Rule definition.

m030rs0016 f:
RULE: Constraint Ruleset MUST be a Compare statement.
ERROR: ... Constraint ruleset encountered that does not begin with IF.
Use the appropriate design tool to change the I/O Rule definition.

RULESET ERRORS (2000-3999)

GLOSSARY

'macro RULESET'   refers to a ruleset that is to be included inline in the Generated ITL. This is normally USER ITL.

'physical object' is used as a generic term for Screen, Transaction, Record, Report etc.

INSERTION POINT   refers to where a 'macro RULESET' is to be inserted in the Generated ITL.

ITL Generated code chained off a RULESET entity.

The error codes given in this section reflect problems detected by Analyze. These messages may be preceded by a set of messages that identify corrupt data.

m030rs2000 f:
ERROR: Invalid rule type specified for ruleset.
The ruleset does not have one of the valid values as its rule type.

m030rs2001 f:
ERROR: Error ee detected during LOCK REFRESH.
ee is the error code that identifies the error. Analyze was unable to refresh the locks on the PROCESS. This may happen if someone else loads the PROCESS while ITL is being created. Have all other SEs release the PROCESS, then try again.

m030rs2002 f:
ERROR: Error ee detected during create of ruleset for analyze.
ee is the error code that identifies the error. This may happen if there is insufficient memory to allocate the RULESET. If a memory allocation failed then try to reduce the number of tools that are loaded and then attempt to re-run Analyze.

m030rs2003 f:
ERROR: Error ee detected during create of ruleset.
ee is the error code that identifies the error. This may happen if there is insufficient memory to allocate the RULESET. If a memory allocation failed then try to reduce the number of tools that are loaded and then attempt to re-run Analyze.

m030rs2004 f:
ERROR: Found a bad type for an ITL record.
ERROR: RULESET = (inst_type, id1, id2, id0)
(inst_type, id1, id2, id0)- is the database key for the RULESET. Analyze has detected a corrupt ITL chain. An ITL record was expected, but not encountered.

m030rs2005 f:
ERROR: Error ee detected during ITL insert.
ee is the error code that identifies the error. This may happen if there is insufficient memory to allocate the ITL entity. If a memory allocation failed then try to reduce the number of tools that are loaded and then attempt to re-run Analyze.

m030rs2006 f:
ERROR: This process requires a ruleset named rrrr.
ERROR: This ruleset already exists but is not connected to
ERROR: this process; it is connected to process pppp ERROR: Creation of the ruleset would cause a duplicate short name so no ITL can be stored.

rrr is the short name of the RULESET. pppp is the short name of the PROCESS to which the existing RULESET is connected, if there is a PROCESS connection. RULESET names must be unique. Analyze has detected that the RULESET being created for this PROCESS will not be unique. Use GRM to reconcile this problem.

m030rs2007 f:
ERROR: NODE (inst_type, id1, id2, id0) is marked as ssss.
ERROR: ... and has an INCA data base reply code of rrrr!
(inst_type, id1, id2, id0) - is the database key for the RULESET. ssss - is the status of the entity, one of the following:
   NEW/MODIFIED
   DELETED
   UNCHANGED
rrr - is the reply code of the entity.

m030rs2008 f:
ERROR: Error ee detected during freeing of ITL storage.
A severe error has occurred.

m030rs2009 f:
ERROR: Found a bad type for ITL record during copy.
Analyze has detected a corrupt ITL chain while bringing in a 'macro RULESET'. An ITL record was expected, but not encountered.

m030rs2010 f:
ERROR: Target of RS->RS relate is NULL:
ERROR: Itl key: (%d, %d, %d, %d) Action mode: %c
ERROR: Target key: (%d, %d, %d, %d)
The ITL entity references a RULESET that does not exist on the database. Use Code Window to reconcile the problem.

m030rs2011 f:
ERROR: Out of memory error in RS1101_add_param_to_list()
This may happen if there is insufficient memory to allocate space for processing. If a memory allocation failed then try to reduce the number of tools that are loaded and then attempt to re-run Analyze.

m030rs2012 f:
ERROR: Invalid Comparator of ee found.

cc is the code for the comparator encountered in the ITL record. Analyze expects a valid comparator (eg. EQUAL or GREATER THAN), but encounters the token cc instead. Use Code Window to reconcile this problem.

m030rs2013 f:
ERROR: Invalid Conjunctor of cc found.

cc is the code for the CONJUNCTOR encountered in the ITL record. Analyze expects a valid CONJUNCTOR (eg. AND, or OR), but encounters the token cc instead. Use Code Window to reconcile this problem.

m030rs2014 f:
ERROR: Invalid insertion point.
ERROR: Insertion point of ii encountered.

ii is the code for the INSERTION POINT context encountered in the RULESET. Analyze has found an invalid INSERTION POINT while bringing in a 'macro RULESET'. Use Code Window to reconcile this problem.

m030rs2015 f:
ERROR: Constraint not found for PK component with access intent of INSERT.
A PK component with Access Intent of INSERT must be constrained for the READ that checks that the record does not already exist. No constraint was found for the above PK component. Load the appropriate Design tool to rebuild the physical object (Screen, Transaction, etc).

m030rs2016 f:
ERROR: Out of memory in RS1410_Create_recur_tree.
This may happen if there is insufficient memory to allocate space for processing. If a memory allocation failed then try to reduce the number of tools that are loaded and then attempt to re-run Analyze.

m030rs2017 f:
ERROR: Out of memory in RS1410_Create_recur_tree.
This may happen if there is insufficient memory to allocate space for processing. If a memory allocation failed then try to reduce the number of tools that are loaded and then attempt to re-run Analyze.

RULESET WARNINGS (4000-5999)

The following warnings occur when validating ITL. They are not fatal errors, however, the code translate phase may not succeed if these situations are not corrected. In the case of invalid ITL, using the Code Window tool will help identify the statements in error.

m030rs4000 w:
WARNING: Missing END Statement(s) detected in the genned ITL
Self-explanatory.

m030rs4001 w:
WARNING: Missing Subroutine or Action Mode End Statement(s) detected in the genned ITL
Self-explanatory.

m030rs4002 w:
WARNING: Missing End Statement(s) detected in the user ITL
Analyze has detected errors in the user augmented code. Use Code Window to resolve the problem.

m030rs4003 w:

WARNING: Missing Subroutine or Action Mode END Statement(s) detected in the user ITL Analyze has detected errors in the user augmented code. Use Code Window to resolve the problem.

m030rs4004 w:
WARNING:   Unsubstituted variable found in macro!!!
WARNING:   Macro: mmmm
WARNING:   Macro key: (inst_type, id1, id2, id0)
WARNING:   Variable:   Field
WARNING:   Variable key: (inst_type, id1, id2, id0) (bb)
WARNING:    ITL key: (inst_type, id1, id2, id0) action mode: aa
mmmm    - the short name of the macro, if any.
(inst_type, id1, id2, id0) - the database key of the entity.
Field   - the Field information, if any.
bb      - the buffer number of the offending variable.
aa      - the ITL action mode.
Analyze could not find a Field on the physical object being analyzed to substitute for the variable indicated in the macro ruleset. Load Code Window to rebuild the ruleset.

m030rs4005 w:
WARNING:   A user created work variable is being used as a subscript:
WARNING: The field: Field is subscripted by the work variable: ssss It is the user's responsibility to make sure this work variable is being used properly.
Field   - The description of the subscripted Field.
ssss    - The short name of the subscript variable.
Load Code Window if necessary.

SCREEN ERRORS (2000-3999)

m030sc2000 f:
ERROR: Screen node has NULL subord pointer.
This may happen if there is insufficient memory to allocate the subodinate structure. If a memory allocation failed then try to reduce the number of tools that are loaded and then attempt to re-run Analyze.

m030sc2001 f:
ERROR: Screen node has no associated data.
This may happen if there is insufficient memory to allocate the data structure. If a memory allocation failed then try to reduce the number of tools that are loaded and then attempt to re-run Analyze.

m030sc2002 f:
ERROR: Screen node associated I/O type node not found.

m030sc2003 f:
ERROR: Screen node has NULL PHYS MAP pointer.
The Screen currently being validated has no physical fields i.e. no physical map, Modeled Field or Derived Field. This is illogical. Use Screen Design to modify the Screen.

m030sc2004 f:
ERROR: This is a Summary Screen with dynamic access intent...
ERROR: ...For such a screen, there must be a DERIVED field with flagged...
ERROR: ...for use as a LINE ITEM MAINTENANCE field.
ERROR: ...No such field was found.
Return to Screen design to add this derived field or set the line item maintenance flag for the existing derived field.

m030sc2005 f:
ERROR: This is a Summary Screen with NO dynamic access intent.
ERROR: ...For such a screen, there must be a Screen DERIVED Field with flagged for use as a MENU SELECTION field.
ERROR: ...No such field was found.
Return to Screen Design to add this derived field or set the menu selection flag for the existing derived field.

m030sc2006 f:
ERROR: This invention only supports Combined Reference Editor/Processor for Summary Screen processing.
Use the Define Screen option in Screen Design to turn off the Combined Reference Editor/Processor flag for the Screen. Otherwise, change the Screen definition to use Summary Screen processing.

m030sc2007 f:
ERROR: Screen EXT Transaction code NOT defined.
Every Screen must have an External Transaction code defined before a Screen can be analyze or generated. Use the Define Screen option in Screen Design to specify the EXT Transaction code for Screen.

m030sc2008 f:
ERROR: Screen 's' has no Batch 'destination program',
ERROR: ...On-Line mode Displayer MUST be set.
For Batch processing, an online Displayer is required. If updates are to be done through Batch then a destination program must be specified. Use the Define Screen option in Screen Design to set the On-Line mode Displayer and specify the Batch 'destination program'.

m030sc2009 f:
ERROR: Screen 's' has a Processor but has no Batch 'destination program', On-Line mode Processor MUST be set.
For Batch processing, an online Processor is required. If updates are to be done through Batch then a destination program must be specified. Use the Define Screen option in Screen Design to set the On-Line mode Processor and specify the Batch 'destination program'.

m030sc2010 f:
ERROR: Screen 's' On-Linemode combination is INVALID.
ERROR: ...Displayer: 'f', Reference Editor: 'f', Processor: 'f'.
Using the Define Screen option in Screen Design, set the valid On-Line mode combination.

m030sc2011 f:
ERROR: Screen 's' has a Processor.
ERROR: ...Either On-Linemode or Batch mode MUST be set.
An On-Line mode or Batch mode must be specified for all screens. Using the Define Screen option in Screen Design, specify either On-Line or Batch mode.

m030sc2012 f:
ERROR: Screen 's' Batch mode combination is INVALID.
ERROR: ...Displayer: 'f', Reference Editor: 'f', Processor: 'f'.
Using the Define Screen option in Screen Design, set the valid Batch mode combination.

m030sc2013 f:
ERROR: A MODEL Field in Command Line CANNOT point to an
ERROR: ...INC Column that has a key source value.
Screen Design should have excluded this field from the Command Line. Load the Screen into the design tool and save.

m030sc2014 f:
ERROR: Unexpected Node type: 'N' in CMD SEQUENCE.
Analyze was received a different Node Type in the CMD Sequence than was expected. This implies that the data base is corrupt.

m030sc2015 f:
ERROR: Command Line size: 'sz' - TOO LONG.
The command line can be no longer than 58 characters. Reload the Screen in Screen Design and save to see if this corrects the problem.

m030sc2016 f:
ERROR: SC Command SEQUENCE node has NO associated DATA.

This may happen if there is insufficient memory to allocate the data structure. If a memory allocation failed then try to reduce the number of tools that are loaded and then attempt to rep-run Analyze.

m030sc2017 f:
ERROR: Unknown Source Type: 'st'.
The source type found was not one of the following:
- Input by User
- From the Command Line
- From Data Table
- From a Literal Value
- Derived
- Omit This implies corrupt data on the data base associated with this Screen.

m030sc2018 f:
ERROR: Source type: 'st' is INVALID.
The source type found was not one of the following:
- Input by User
- From the Command Line
- From Data Table
- From a Literal Value
- Derived
- Omit This implies corrupt data on the data base associated with this Screen.

m030sc2019 f:
ERROR: INVALID occur count: 'c'.
The occur count on the specified table is zero. The logical definition of this screen may be corrupt. Use Screen Design to load the screen and modify the occur count. Save the Screen. Note any messages that may occur during the load and save.

m030sc2020 f:
ERROR: Access Intent information must be specified for all action modes.
ERROR: ...Action mode: 'm' NOT defined.
One of the following Access Intents must be specified for each action mode:
 QUERY
 ADD
 CHANGE
 DELETE
 SUMMARY ACCESS INTENTS
 COPY/ADD
 IGNORE The logical definition of this screen may be corrupt. Use the Screen Design tool to load the screen. Modify the Access Intent for the Action Mode in error. Save the screen. Note any error messages in the message window or console during the load and save.

m030sc2021 f:
ERROR: This is a Summary Screen with dynamic access intent.
ERROR: ...The 'use_activity_field' of 'data_table' MUST be set.

Use Screen Design to set the Act Fld box associated with the derived activity field for the screen. The logical definition of this screen may be corrupt. When loading and saving the screen, note any messages that appear in the console or message window.

m030sc2022 f:
ERROR: Unknown access intent: 'ai'.
One of the following Access Intents must be specified for each action mode:
    QUERY
    ADD
    CHANGE
    DELETE
    SUMMARY ACCESS INTENTS
    COPY/ADD
    IGNORE
The logical definition of this screen may be corrupt. Use the Screen Design tool to load the screen. Modify the Access Intent for the Action Mode in error. Save the screen. Note any error messages in the message window or console during the load and save.

m030sc2023 f:
ERROR: The most superior PHYS MAP's PARENT pointer does NOT point to...its Screen node.
This message implies that the database is corrupt. Try loading the Screen in Screen Design and saving. Note any error messages that appear in the Message Window or the Console.

m030sc2024 f:
ERROR: Unexpected Node type: 't' in SC PHYS MAP.
This message implies that the database is corrupt. Try loading the Screen in Screen Design and saving. Note any error messages that appear in the Message Window or the Console.

m030sc2025 f:
ERROR: Screen MAP node has NO associated DATA.
This may happen if there is insufficient memory to allocate space for the DATA. If a memory allocation failed then try to reduce the number of tools that are loaded and then attempt to re-run Analyze.

m030sc2026 f:
ERROR: INVALID base coordinate x: 'x', y: 'y', definitions.
One or both of the base coordinates is less than zero. The data base may be corrupt. Use Screen Design to load the Screen and save. Note any messages that may appear in the message window or console.

m030sc2027 f:
ERROR: INVALID base coordinate dx: 'x', dy: 'y', definitions.
One or both of the base coordinates is less than zero. The data base may be corrupt. Use Screen Design to load the Screen and save. Note any messages that may appear in the message window or console.

m030sc2028 f:
ERROR: Max Repeat: 'r' is INVALID.
The Max Repeat number is associated with the occur count. The Max Repeat number is less than zero which is INVALID.Thiis may mean that the Screen's physical map is corrupt. Use Screen Design to load and save the Screen in error. Note any errors written in the message window or console.

m030sc2029 f:
ERROR: Screen Field base (x,y) ('x','y') definition is INVALID.
'x' or 'y' or both are less than zero. Either the layout of the Screen is corrupt or has been created wrong. Load the Screen in Screen Design and check the physical layout of the Screen. Save the Screen. Note any messages written to the console or message window.

m030sc2030 f:
ERROR: The LENGTH of Screen Field: 'sf' is INVALID.
The LENGTH of the Screen Field in error is less than one. Every Screen Field has to have a length. This may mean that the Screen Field Data is corrupt. Load the Screen using Screen Design and save. Note any messages written in the message window or console.

m030sc2031 f:
ERROR: Screen Field location (x,y) ('x','y') is INVALID.
This location is not within the coordinates of the Screen. This may mean that the Screen Field data is corrupt. Load the Screen using Screen Design and save. Note any messages written in the message window or console.

m030sc2032 f:
ERROR: Screen Field's max repeat location (x,y)('x','y') is INVALID.
The coordinates of the Screen Field's max repeat location is not within the Screen coordinates. This may mean that the Screen Field data is corrupt. Load the Screen using Screen Design and save. Note any messages written in the message window or console.

m030sc2033 f:
ERROR: Screen Field can NOT fit into screen.
The coordinates of the Screen Field are not within the Screen coordinates. This may mean that the Screen Field data is corrupt. Load the Screen using Screen Design and save. Note any messages written in the message window or console.

m030sc2034 f:
ERROR: LABEL node has NO associated DATA.
Label data is corrupt. This may happen if there is insufficient memory to allocate the label data. If a memory allocation failed then try to reduce the number of tools that are leaded and then attempt to re-run Analyze.

m030sc2035 f:
ERROR: A MODEL INC Column's associated Access Intent node NOT found.

This may happen if there is insuffiecient memory to allocate the Access Intent node. If a memory allocation failed then try to reduce the number of tools that are loaded and then attempt to re-run Analyze.

m030sc2036 f:
ERROR: A Screen Field with source of BNF_C must appear in the Command Line.
The sequence node associated with this Screen Field doesn't exist. Return to Screen Design and make sure this field is in the command line. Note any messages that may appear in the console or message window during the load or save.

m030sc2037 f:
ERROR: A Screen Field associated with a System_Assigned Key or...a Derived Data Column must be PROTECTED.
The user should not be allowed to update in any way a System-Assigned Key or a Derived Date Column. Return to Screen Design and correct the field in error.

m030sc2038 f:
ERROR: A Modeled Field associated with a DT with access ...intent of ignore must have good attributes...of PROTECTED and INVISIBLE.
A Modeled Field associated with an ignoreD DT should not exist on the Screen. Return to Screen Design and change the good attributes for this field.

m030sc2039 f:
ERROR: UNKNOWN field attribute: 'a'.
ERROR: ...It MUST be 'P' for PROTECTED or 'U' for UNPROTECTED.
The data associated with the field attribute is corrupt. Load and save the Screen noting any messages displayed in the console or message window.

m030sc2040 f:
ERROR: Unknown field attribute: 'a',...It MUST be 'N' for NORMAL intensity or 'B' for BRIGHT intensity, ...or 'D' for DARK (invisible).
The data associated with the field attribute is corrupt. Load and save the Screen noting any messages displayed in the console or message window.

m030sc2041 f:
ERROR: INVALID retrieval order: 'o'.
A Screen field can be used to alter the order in which data is selected for retrieval - if the associated DBMS supports this capability. Only the values ascending and descending are supported.

m030sc2042 f:
ERROR: Insufficient memory to allocate missing key struct...Unable to continue ...

There wasn't enough space to allocate the missing key struct. Try to reduce the number of tools that are loaded and then attempt to re-run Analyze.

m030sc2043 f:

ERROR: Both Screen Fields have flagged for use as a Line Item Maintenance,
ERROR: ...Only one may use as a Line Item Maintenance!
Since more than one field is flagged for use as Line Item Maintenance, the Logical definition of the screen may be corrupt. Use the Screen Design tool to load the screen and modify the Line Item Maintenance flag in error. Note any messages displayed in the Message Window or Console during the load or store.

m030sc2044 f:
ERROR: Screen Field: 'f' is flagged for use as a Line Item Maintenance,
ERROR: ...then there must have an IO->DT with access intent of ALL.
Using Screen Design, edit the Screen to add an Access Intent of ALL or turn the Line Item Maintenance flag off. Note any messages diplayed in the console or message window during the load and store. There might be currupt data in Logical Definition of this Screen.

m030sc2045 f:
ERROR: Screen Field: 'f' is flagged for use as a Line Item Maintenance,
ERROR: ...but NONE of the IO->DT have 'use activity field' flag set.
Using Screen Design, edit the Screen to add an access intent of ALL or turn the Line Item Maintenance flag off. Note any messages displayed in the console or message window during the load and store. There might be currupt data in Logical Definition of this Screen.

m030sc2046 f:
ERROR: Both Screen Fields have flagged for use as a Menu Selection,...Only one may be used as a Menu Selection.

m030sc2047 f:
ERROR: Screen Field: "f" has flagged for use as a Line Item Maintenance...AND as a Menu Selection at the same time.

m030sc2048 f:
ERROR: Screen Field: "f" has flagged for use as a Menu Selection,...but NONE of the IO->DT have 'use activity field' flag set.

m030sc2049 f:
ERROR: The target SC->DE for Summary Screen processing must have...'good' attribute of UNPROTECTED.

m030sc2050 f:
ERROR: The target Data Element of Summary Screen SC->DE does NOT match
ERROR: ...with the designated activity Data Element.
ERROR: ...SC->DE target key ('target_type', 'target_id1', 'target_id2', 'target_id0')

ERROR: ...The activity DE key ('inst_type', 'id1', 'id2', 'id0')

m030sc2051 f:
ERROR: Unknown PHYSICAL IO TYPE: 't'.

m030sc2052 f:
ERROR: Unknown CMM NODE TYPE: 't'.

SCREEN WARNINGS (4000-5999)

m030sc4000 w:
WARNING:A Screen type must be a Model 2, 3, 4, 5.
Screen will be default to a Model 2 type.
Model-2 screens are 24 rows by 80 columns.
Model-3 screens are 32 rows by 80 columns.
Model-4 screens are 43 rows by 80 columns.
Model-5 screens are 27 rows by 132 columns.
If a Screen has an invalid model type then a default of type Model-2 will be taken.

m030sc0020 f:
WARNING:A Screen flagged as INQUIRY-ONLY may NOT have a Reference Editor or Processor.
If a Reference Editor is desired for the specified Screen then use the Define Screen option in the Screen Design tool to turn off the only' flag for the Screen. If no Reference Editor is required then use the Define Screen option in the Screen Design tool to turn off the Reference Editor indicator.

m030sc0021 f:
WARNING: A Screen Field with a source of LITERAL cannot appear in the Screen COMMAND LINE.
This is an illogical specification.

m030sc0022 f:
WARNING: A key Screen Field that has a literal value must have that literal value for all action modes.
A key Screen Field is a field on the Screen that corresponds to a Primary key component from an associated Data Table. Since a Screen Field that has an initial value cannot appear in the Screen Command Line then if the key component is constrained by a literal value for one action mode then it must be constrained by that same literal value for all action modes.

m030sc0023 f:
WARNING: A non-key Screen Field may only have a source of LITERAL if the associated Data Table has an access intent of INSERT.
A non-key Screen Field is a field on the Screen that corresponds to non_PK Column from an associated Data Table. The only time it makes sense to give such a field an intial value is when a row is being INSERTed into that Data Table. If you wish to retrieve only rows from that Data Table where the non_PK Column has a specific (range of ) value, then this should be done by adding additional I/O access constraints for that Data Table through Code Window.

SCREEN INFORMATION MESSAGES (6000-7999)

m030sc6001 i:
INFO: This invention supports screens with a Combined Reference Editor/Processor
INFO: ...It may be more efficient than using separate Reference Editor and Processor.

m030sc6002 i:
INFO: 'Required field' validation will be at the Screen level.
INFO: ...This means that where possible all errors will be detected ...
INFO: ... on a single entry to the Reference Editor.
INFO: ...However, it must be understood that the error message sent ...
INFO: ... may not be applicable to the second and subsequent fields ...
INFO: ... that are in error.

m030sc6003 i:
INFO: Key validation will be at the Screen level.
INFO: ...This means that where possible all key errors will be detected ...
INFO: ... on a single entry to the Reference Editor.
INFO: ...However, it must be understood that the error message sent ...
INFO: ... may not be applicable to the second and subsequent key ...
INFO: ... fields that are in error.

m030sc6004 i:
INFO: Model 'number' screens should be 'r' rows by 'c' columns.

m030sc0001 f:
RULE: A Screen must be defined before analysis.
ERROR: ... the Screen with instance id sssss is undefined.
The Analyze tool was called to analyze a non-existent Screen. The value sssss in the accompanying error message identifies the Screen key that was passed to Analyze.

m030sc0002 f:
RULE: A Screen COMMAND LINE location MUST be TOP or BOTTOM.
ERROR: ...'l' is INVALID.
The Analyze tool detected an invalid location for the Command Line. The value l in the error message identifies the value for the Command Line location. A Command Line may be at the TOP of the Screen or at the BOTTOM of the Screen.

m030sc0003 f:
RULE: A Screen COMMAND LINE Key location MUST be LEFT or RIGHT.
ERROR: ...'l' is INVALID.

The Analyze tool detected an invalid key location for the Command Line. The value 1 in the error message identifies the value for the Command Line key location.

A Command Line comprises two main components:- o   the action mode and business function together identify
    a transaction
o   the KEY area is the area in which the end-user at run-time
    enters the constraints etcetera for the transaction.

The Command Line KEY location may be on the left or right side of the Command Line. Both components, however, must be on the same line.

m030sc0004 f:
RULE: A Screen COMMAND LINE field must have information specified for all action modes.
ERROR: ...Action mode: a NOT defined,
The error message is followed by information that identifies the particular Command Line field in error. The value a in the error message identifies the action mode for which the specified Command Line field is deficient.

m030sc0005 f:
RULE: A Screen COMMAND LINE CONSTRAINT may be EQUAL or GREATER THAN OR EQUAL.
ERROR: ...INVALID constraint type: tt,
The error message is followed by information that identifies the action mode and Command Line field in error. The value tt in the error message identifies the value of the bad constraint type.

m030sc0006 f:
RULE: For the DISPLAYER to be able to retrieve a SPECIFIC row from a Data Table, the primary key must be well-defined at run-time.
ERROR: ... The Command Line field is optional.
To ensure that this key component is well-defined at run-time, the Command Line field must be required. In action Mode = 'am' m030sc0007 f:
RULE: A Screen that is not INQUIRY-ONLY screens must have a Reference Editor.
ERROR: NO Reference Editor was defined in Screen 's'.
If a Reference Editor is desired for the specified Screen then use the Define Screen option in Screen Design to turn off the 'inquiry only' flag for the Screen. If no Reference Editor is required then use the Define Screen option in Screen Design to turn off the Reference Editor indicator.

m030sc0008 f:
RULE: A Screen with a separate Processor must have a Reference Editor.
ERROR: Screen: 's' has NO REFERENCE EDITOR defined.
Since all reference edits are done in the Reference Editor we demand that all non-INQUIRY- ONLY Screens have a Reference Editor.

m030sc0009 f:
RULE: A Screen must have at least ONE action mode defined.
ERROR: NO action mode defined in Screen 's'.
Use Screen Design to define information for this Screen.

m030sc0010 f:
RULE: Summary Screen PROCESSING may only be selected for one Data Table.
ERROR: Both Data Tables have 'use_activity_field' flag set!or
ERROR: Both Data Tables have an access intent of ALL!
Summary Screens are used to support dynamic access intents whereby the user at run-time can identify which rows of a SINGLE Data Table may be modified or deleted or inserted. Summary Screens are also used to act as routers. In this mode, the end-user can enter a code onto a field on the Screen and control will be switched to the appropriate PROCESS etc; this requires that augmented code be added through CODE WINDOW. ONLY ONE Data Table may have the 'activity field' flag associated with set and only one Data Table may have an access intent of ALL.

m030sc0011 f:
RULE: A Summary Screen must have the 'activity de name' defined in the System record.
ERROR: The field should contain alphabetic or numeric characters.
The System record contains an 'activity de name' field. This field, which must be filled in, contains the SHORT NAME of a Data Element that is to play the role of the activity field on a Summary Screen.

m030sc0012 f:
RULE: The 'activity de name' must be the name of a Data Element.
ERROR: The activity Data Element NOT found in the database.
The System record contains an 'activity de name' field. This field, which must be filled in, contains the short name of a Data Element that is to play the role of the activity field on a Summary Screen. Use Generic Entity Maintenance to determine if the named field is a Data Element; correct the name if this is not the case.

m030sc0013 f:
RULE: The 'activity de name' Data Element should have a CHARACTER format and have a length of one.
ERROR: The target DE for Summary Screen PROCESSING has a non-character format.or
ERROR: The target DE for Summary Screen PROCESSING has a field length of 1.
Use Generic Entity Maintenance to view the named field and modify its attributes accordingly.

m030sc0014 f:

RULE: A Summary Screen must have the 'line character add' defined in the System record.
ERROR: The field should contain alphabetic or numeric characters.
This field in the System record identifies the character that the end-user will use in a Summary Screen to request an Insert. Use Generic Entity Maintenance to edit this field in the System record.

m030sc0015 f:
RULE: A Summary Screen must have the 'line character change' defined in the System record.
ERROR: The field should contain alphabetic or numeric characters.
This field in the System record identifies the character that the end-user will use in a Summary Screen to request an update. Use Generic Entity Maintenance to edit this field in the System record.

m030sc0016 f:
RULE: A Summary Screen must have the 'line character delete' defined in the System record.
ERROR: The field should contain alphabetic or numeric characters.
This field in the System record identifies the character that the end-user will use in a Summary Screen to request a delete. Use Generic Entity Maintenance to edit this field in the System record.

m030sc0017 f:
RULE: A Screen may only have one PAGEABLE browse but may have one or more NON-PAGEABLE browses.
ERROR: Only one Data Table may be pageable!
The error message is preceded by the action mode and names of two Data Tables that both have the PAGEABLE browse indicator set. A pageable browse is one where if the Screen is filled with data for that Data Table in the Displayer then the Command Line is automatically primed so that the end-user can simply press the Enter key to continue browsing the available rows for that Data Table.

A non-pageable browse is one where if ( a section of ) the Screen is filled with data for the associated Data Table then the display of the data is terminated i.e. there may be more rows to display but these are discarded since there is insufficient room to display them. This invention does NOT support generating Screens with multiple PAGEABLE browses because of the complications associated with scrolling the data.

m030sc0018 f:
RULE: A Screen must have at least ONE field defined on it.
Self explanatory.

m030sc0019 f:

RULE: A Screen Field must have information specified for all action modes.
ERROR: Action Mode: 'a' NOT defined.
Each field that participates in a Screen must have information specified for each action mode associated with that Screen. Use Screen Design to provide the missing information.

m030sc0020 f:
RULE: A Screen flagged as INQUIRY-ONLY may NOT have a Reference Editor or Processor.
If a Reference Editor is desired for the specified Screen then use the Define Screen option in Screen Design to turn off the only' flag for the Screen. If no reference editor is required then use the Define Screen option in Screen Design to turn off the reference editor indicator.

m030sc0021 f:
RULE: A Screen Field with a source of LITERAL cannot appear in the Screen COMMAND LINE.
This is an illogical specification.

m030sc0022 f:
RULE: A key Screen Field that has a literal value must have that literal value for all action modes.
A key Screen Field is a field on the Screen that corresponds to a primary key component from an associated Data Table. Since a Screen Field that has an initial value cannot appear in the Screen Command Line then if the key component is constrained by a literal value for one action mode then it must be constrained by that same literal value for all action modes.

m030sc0023 f:
RULE: A non-key Screen Field may only have a source of LITERAL if the associated Data Table has an access intent of INSERT.
A non-key Screen Field is a field on the Screen that corresponds to non_PK Column from an associated Data Table. The only time it makes sense to give such a field an intial value is when a row is being INSERTed into that Data Table. If you wish to retrieve only rows from that Data Table where the non_PK Column has a specific (range of) value, then this should be done by adding additional I/O access constraints for that Data Table through Code Window.

m030sc0024 f:
RULE: A Screen Field may not have a source from a Data Table if the associated Data Table has an access intent of INSERT.
This is an illogical specification.

m030sc0025 f:
RULE: A Screen Field with source from INPUT BY USER must have access intent of IN- SERT.
A Screen Field cannot have a source of input by user if the Data Table that the field is associated with does not have an access intent of Insert. This is an illogical specification.

m030sc0026 f:
RULE: A Screen Field with a source type of INPUT BY USER must be UNPROTECTED.
If the end-user is to be able to input a value then the field must be unprotected. Use Screen Design to change the attributes of the given field.

m030sc0027 f:
RULE: A Screen Field associated with a Data Table that has an access intent of READ must be PROTECTED.
ERROR: The Screen Field is UNPROTECTED.
The error message is preceded by information that identifies the Screen field in error. It is senseless to allow an end-user to modify data from a row of a Data Table if the Data Table has an access intent of Read. Use Screen Design to change the attributes of the given field.

m030sc0028 f:
RULE: A key Screen Field associated with a Data Table that has an access intent of READ, DELETE or UPDATE must be PROTECTED.
ERROR: The Screen Field is UNPROTECTED.
The error message is preceded by information that identifies the Screen field in error. A key Screen Field is a field on the Screen that corresponds to a primary key component from an associated Data Table. A key component may only be unprotected if that field is to be used to insert a row into the associated Data Table. Use Screen Design to change the attributes of the given field.

m030sc0029 f:
RULE: A key Screen Field associated with a Data Table that has an access intent of ALL must be PROTECTED.
ERROR: The Screen Field is UNPROTECTED.
This field must be PROTECTED. For INSERTS, this field will be switched to UNPROTECTED at run time. The error message is preceded by information that identifies the Screen field in error. A key Screen Field is a field on the Screen that corresponds to a primary key component from an associated Data Table. A key component may only be unprotected if that field is to be used to insert a row into the associated Data Table. Use the Screen Design tool to change the attributes of the given field.

m030sc0030 f:
RULE: A key Screen Field may not have source type of OMIT.
A key Screen Field is a field on the Screen that corresponds to a primary key component from an associated Data Table.

m030sc0031 f:
RULE: A Screen must contain a Screen Field for every non-PK NO NULLS column for every Data Table with an access intent of INSERT.
We cannot allow a row to be added to a Data Table if there are NO NULLS collumns that are undefined. Use the Screen Design tool to change add the missing NO NULLS field(s).

m030sc0032 f:
RULE: A Screen Field associated with a Derived Data Column cannot update the associated

Data Table.
A Derived Data Column by definition is one that does not participate in the application database version of the row; it is a value that is calculated from other columns in the current Data Table row.
m030sc0033 f:
RULE: A Screen Field associated with a Data Table that has an access of READ may not update that Data Table.
This is an illogical specification. The error message is followed by details of the field in error.

*********************************************************************************

RULE: A Screen Field must exist for all PK Columns that do not inherit their value from other Data Tables.
The Primary key for a Data Table must be well-defined. Use the Screen Design tool to try to set up the details for the identified missing PK components. If this fails, call INCA support for a resolution of this problem.
*********************************************************************************
m030sc0034 f:
RULE: A DERIVED Screen Field must have a source type of DERIVED.
Any other source specification is invalid.

m030sc0035 f:
RULE: A Screen Field RETRIEVAL ORDER must be ASCENDING or DESCENDING.
ERROR: INVALID retrieval order: 'O'.
A Screen field can be used to alter the order in which data is selected for retrieval - if the associated DBMS supports this capability. Only the values ASCENDING and DESCENDING are supported.

RULE: A Screen Field must have a valid Screen edit pattern.
A Screen field inherits the Screen edit pattern of the Data Element on which the field is based; the value must be valid. Use Generic Entity Maintenance to edit the Data Element if known.

RULE: A Screen Field with an initial value must have a valid initial value.
Use the Screen Design to change the initial value of the field to a valid value.

SYSTEM RULES (1-1999)

m030sy0001 f:
RULE: A System must be defined before analysis.
ERROR ... the System with instance id sssss is not defined.
The Analyze tool was called to analyze a non-existent System. The value sssss in the accompanying error message identifies the System key that was passed to Analyze.

m030sy0002 f:
RULE: A System may be connected to a SUB-System and/or a PROCESS.
ERROR: ... System connected to an entity of type tt.

The Analyze tool was probably called to analyze a System. A System may only be connected, through System Component Construction (SCC), to a SUB-System or a Process. The value tt in the accompanying error message identifies the type of unexpected entity that Analyze found connected to the System.

m030sy0003 f:
RULE: A System must have a connection type of PARENT.
ERROR: ... connection of type tt found.
The Analyze tool was probably called to analyze a System. All entities connected to a System have the System as their Parent. The value tt in the accompanying error message identifies the type of connection for the entity that Analyze found connected the System.

m030sy0004 f:
RULE: A System must be connected to at least one PROCESS or SUB-System.
ERROR: ... the System, sss, has no connections.
This is a trivial System if no entities are connected to it. Analysis is pointless.

m030sy0005 f:
RULE: A System must have at least one PROCESS within its tree structure.
ERROR: ... the System, sss, has no PROCESS in its tree structure.",
This is a trivial System if no entities are connected to it. Analysis is pointless.

SYSTEM ASSIGNED KEY RULES (1-1999)

m030sa0001 f:
RULE: A Screen, or Transaction may be used to initialize or update
RULE:    the seed value in a Seed Data Table. Such a Screen or
RULE:    Transaction may only access that Seed Data Table.
ERROR: ... Multiple Data Tables found.
A Screen or Transaction may contain only the Seed Data Table. Use the appropriate Design tool to modify the Screen or Transaction.

m030sa0002 f:
RULE: A Seed Data Table must exist.
ERROR: ... Seed Data Table not found for column:
ERROR: ... cccc
ERROR: ... in DATA TABLE 'dddd'.
ERROR: ... The system default Seed Data Table is not defined.
cccc is the Column and dddd is the long name of the Data Tables in which the Column participates. The column is flagged as System Assigned but a Seed Data Table does not exist. Contact your cluster administrator. The key of the system default Seed Data Table is carried in the System instance record, which can be editted using GEM. The instance key of the default Seed Data Table should be entered into the first group of fields in the System record.

m030sa0003 f:

RULE: A Seed Data Table must have a data table type of 'seed'.
ERROR: ... DATA TABLE 'dddd' is not of type 'seed'.
dddd is the long name of the Seed Data Table. One or more Columns that are system assigned keys reference the named Data Table as their Seed Data Table. However, the given Data Table is not flagged as a Seed Data Table. Use the IM tool to change the Seed Data Table to have a type of 'seed'.

m030sa0004 f:
RULE: A Seed Data Table must not contain foreign key components.
ERROR: ... Seed Data Table 'dddd' has foreign key components.
dddd is the long name of the Seed Data Table. A foreign key component was detected in the Seed Data Table. This is invalid. A Seed Data Table may only contain two Columns:- i) the PK Column for the Seed Data Table ii) an attribute Column that represents the Seed value. Use the IM tool to break the relationships between the given Data Table and the related Data Tabless.

m030sa0005 f:
RULE: A Seed Data Table may not have multiple columns in its
RULE:    PRIMARY KEY.
ERROR: ... Seed Data Table 'dddd' has multiple primary key components.
dddd is the long name of the Seed Data Table. The Seed Data Table may only contain ONE primary key component. Use the IM tool to edit the given table so that it contains only one primary key component.

m030sa0006 f:
RULE: A Seed Data Table may not contain a system assigned key.
ERROR: ... SEED DT 'dddd' has a system assigned key.
dddd is the long name of the Seed Data Table. The primary key component column for the Seed Data Table is as System Assigned; this is not permitted. Use the IM tool to unset the System Assigned flag for the one primary key component.

m030sa0007 f:
RULE: A Seed Data Table may only contain two columns -
RULE:    a primary key column and a seed value column.
ERROR: ... SEED DT 'dddd' has more than 2 columns.
dddd is the long name of the Seed Data Table. Too may columns were encountered for the Seed Data Table. A Seed Data Table may only contain two Columns:- i) the PK Column for the Seed Data Table
ii) an attribute Column that represents the Seed value.

Use the IM tool to edit the given Data Table.

m030sa0008 f:
RULE: A Seed Data Table primary key Data Element must not
RULE: contain decimal places.

ERROR: ... SEED primary key component column:
ERROR: ... cccc
ERROR: ... has nnnn decimal places.

cccc is the Column and nnnn is the number of decimal Places. This rule also applies to the attribute column (i.e. the 'seed value' column). Use the IM tool to edit the given Column.

m030sa0009 f:
RULE: A Seed Data Table primary key Data Element must have
a format of binary, packed decimal, or zoned.
ERROR: ... SEED primary key component column:
ERROR:... cccc
ERROR... has a data format of 'ffff'.

cccc is the Column and ffff is the Data Format. This rule also applies to the attribute column (i.e. the 'seed value' column). Use the IM tool to edit the given Column.

m030sa0009 f:
RULE: A Seed Data Table primary key Data Element may not
RULE: be signed.
ERROR: ... SEED primary key component column:
ERROR: ... cccc
ERROR: ... has a sign indicator of TRUE.

cccc identifies the Column. The Column is based on a Data Element which is signed. This rule also applies to the attribute column (i.e. the 'seed value' column). Use the IM tool to edit the given Column.

SYSTEM ASSIGNED KEY ERRORS (2000-3999)

The error codes given in this section reflect problems detected by Analyze.

m030sa2000 f:
ERROR: ... There is a default Seed Data Table KEY in the System ...
ERROR: ... record but there was an error on the load of the node.
ERROR: ... The default Seed Data Table KEY is (k0, k1, k2, k3).

Contact your cluster administrator. The key of the system default Seed Data Table in the System instance record is (k0, k1, k2, k3). A problem was detected when attempting to load this Data Table. Use GEM to edit key of the default Seed Data Table into the first group of fields in the System record.

m030sa2001 f:
ERROR: ... There is a default SEED FL->RC KEY in the System ...
ERROR: ... record but there was an error on the load of the node.
ERROR: ... The default SEED FL->RC KEY is (k0, k1, k2, k3).

Contact your cluster administrator. The key of the system default File-to-Record in the System instance record is (k0, k1, k2, k3). This key identifies which File/Record pair is to be accessed when retrieving System ASSIGNED KEY information. A problem was detected when attempting to load the File and Record information. Use GEM to edit key of the default Seed Data Table into the second group of fields in the System record.

m030sa2002 f:
ERROR: ... No SEED FL-RC key exists for Seed Data Table 'dddd' ...
ERROR: ... Furthermore, the default SEED FL-RC key does not exist.
dddd is the name of the Seed Data Table that has been defined as the seed data table for one or more Columns. However, no File-to-Record key has been specified for one or more of those Columns. Furthermore, there is no default File-to-Record key in the System record. Use GEM to edit key of the default Seed Data Table into the second group of fields in the System record so that at least a default File-to-Record is defined.

m030sa2003 f:
ERROR: ... Corrupt data found!!!...
ERROR: ... SEED FL-RC with key (k0, k1, k2, k3) not found in database.
One or more Columns that have System Assigned keys have been found that contain a bad File-to_Record key. Use the IM tool to check that tables that have SA keys have a valid File/Record pair specified. If no bad File/Record pairs are found then check the System record.

m030sa2004 f:
ERROR: ... Corrupt data found!!!...
ERROR: ... SEED FL-RC with key (k0, k1, k2, k3) has a bad target type of 't'.
One or more Columns that have System Assigned keys have been found that contain a bad File-to_Record key. Use the IM tool to check that tables that have SA keys have a valid File/Record pair specified. If no bad File/Record pairs are found then check the System record.

SYSTEM ASSIGNED KEY INFORMATION MESSAGES (6000-7999)

m030sa6000 i:
INFO: The system default Seed Data Table is being used...
INFO: ... to seed the DATA TABLE 'dddd'.
This message identifies that the System default Seed Data Table definition is the one being used as the basis for the seeding of the System Assigned key in Data Table 'dddd'.

SUBSYSTEM RULES (1-1999)

m030su0001 f:
RULE: A SUB-System must be defined before analysis.
ERROR: ... the SUB-System with instance id sssss is undefined.
The Analyze tool was called to analyze a non-existent Sub-System. The value sssss in the accompanying error message identifies the Sub-System key that was passed to Analyze.

m030su0002 f:
RULE: A SUB-System must be the target of a PARENT connection from a System or SUB-System.
ERROR: ... the SUB-System, su-name, has no such connection.
The value su-name in the accompanying error message identifies the Sub-System that has no PARENT System or SUB-System. Use SCC to connect the SUB-System to a valid Parent.

m030su0003 f:
RULE: A SUB-System must be the PARENT connection to a SUB-System or PROCESS.
ERROR: ... the SUB-System, su-name, has a PARENT connection to entity type tt.
The value su-name in the accompanying error message identifies the SUB-System that has a bad connection to an entity of type tt.

m030su0004 f:
RULE: A SUB-System may only have connections of type PARENT, INPUT or OUTPUT.",
ERROR: ... the SUB-System, su-name, has a connection type tt.
The value su-name in the accompanying error message identifies the Sub-System that has a bad connection type tt.

TRANSACTION RULES (1-1999)

In the descriptions that follow a Modeled field is one that is based on a Column from a DATA TABLE. A DERIVED field is based on a Data Element rather than a Column.

RULE: A Transaction must be defined before analysis.
ERROR: ... the Trnasaction with instance id sssss is undefined.
The Analyze tool was called to analyze a non-existent Trnasaction. The value sssss in the accompanying error message identifies the Transaction key that was passed to Analyze.

RULE: A Transaction MUST be connected to a File.
ERROR: ...Trnasaction (sss) has no File.
Each Trnasaction record must be connected to a File before code can be generated. Use Transaction Design to connect the Transaction to a File.

RULE: All Transactions MUST be connected to the same File.
ERROR: ...All Transactions MUST be connected to the same File.
When more that one Transaction record is required for a process, they must all be connected to the same File. Each Transaction record is, in effect, a different record type in the same physical File that will be process sequentially. Use Transaction Design to connect TRANSACTIONs to Files

RULE: A Transaction must have at least ONE action mode defined.
ERROR: ...Transaction (sss) has no action mode defined.
Until at least one action mode is defined, there is no processing associated with the PROCESS. Use Transaction Design to define the action mode(s).

RULE: A Transaction must have a sort key defined.
ERROR: ...A Transaction must have a sort key defined.
Use Transaction Design to define the sort key for the Transaction record. The transaction file will be processed sequentially in this order. Sequence checks will also be performed and the program will terminate if the Transaction File is out of sequence.

RULE: A NON-INHERITED key field must appear on the Transaction, and have a source of Transaction.
ERROR: ...A NON-INHERITED key field must appear on the Transaction, and have a source of Transaction.
All key fields must be supplied, unless they are inherited. Use Transaction Design to define the source and/or value for all fields. The details for the MODEL FIELD in question are printed along with this message.

RULE: An included MODEL FIELD must have a source of Transaction.
ERROR: ...An included MODEL FIELD must have a source of Transaction.
All fields that are included on the Transaction record dsect must have a source of Transaction. Use Transaction Design to define the source and/or value for all fields. The details for the MODEL FIELD in question are printed along with this message.

RULE: An excluded MODEL FIELD may have a source of Literal, Derived, or No Change.
ERROR: ...An excluded MODEL FIELD may have a source of Literal, Derived, or No

Change.
All fields that are suppressed from the Transaction record must have source of Literal, Derived, or No Change. Use Transaction Design to define the source and/or value for all fields. The details for the MODEL FIELD in question are printed along with this message.

RULE: A Derived Data Column may not have a source, it is not updateable.

RULE: A Transaction code field MAY be specified for TRANSACTIONS with just one action mode.

RULE: A Transaction code field MUST be specified for TRANSACTIONS with more than one action mode.

ERROR: ...A Transaction code field MUST be specified for TRANSACTIONS with more than one action mode.
A field (Modeled or DERIVED) must be specified as holding the transaction code when there is more than one action mode for the Transaction. Use Transaction Design to define the transaction code field.

RULE: A Record TYPE field MUST be specified for each Transaction when there is more than one.
ERROR: ...A Record TYPE field MUST be specified for each Transaction when there is more than one.
A field (Modeled or DERIVED) must be specified as holding a record type, when there is more than one Transaction record in use. Use Transaction Design to define the record type field and value(s).

RULE: All Record TYPES must be at the same offset in the Transaction records.
ERROR: ...All Record TYPES must be at the same offset in the Transaction records.
In order for the program to distinguish the different physical record types, the record type field must be located at the same offset in each Transaction record. Use Transaction Design to define the record type field and value(s).

RULE: All Record TYPE values must be unique.
ERROR: ...(sss) is a duplicate value for Transaction (sss).
In order for the program to distinguish the different physical record types, the record type value must be unique for each Transaction record. Use Transaction Design to define the record type field and value(s).

RULE: The same Data Element must be used for the Record TYPE in each Transaction.
ERROR: ...The same Data Element must be used for the Record TYPE in each Transaction.
In order for the program to distinguish the different physical record types, the record type field must be the same Data Element for each Transaction record. Use Transaction Design to define the record type field and value(s).

VIEW RULES (1-1999)

m030vw0001 f:
RULE: AN ALTERNATE INDEX may not contain a DERIVED Field.
ERROR: ... DERIVED Field detected in Alternate Index [VIEW] 'vvvv'.
vvvv is the long name of the View. Use the Record Design tool to modify the View.

m030vw0002 f:

RULE: AN Alternate Index's short name must be less than or equal to 4 characters in length.
ERROR: The Alternate Index's [VIEW] short name is 'vvvv'.

ERROR: Modify the Alternate Index's short name.
vvvv is the short name of the View. Use the Record Design tool to modify the View short name.

m030vw0003 f:
RULE: AN Alternate Index associated with a Record must have its primary key components in the same order as those for the Record.
ERROR: Alternate Index [VIEW] 'vvvv' has its PRIME key components out of order.
See the informational messages that precede this Rule for a definition of the Primary Key for an Alternate Index. vvvv is the long name of the View. Use the Record Design tool to modify the View definition.

m030vw0004 f:
RULE: AN Alternate Index's user fields may not include ALL of the Record key
RULE:   components in the same order as they are in the Record.
ERROR: Entire key for Record 'rrrr' used as PART OF or ALL OF...
ERROR: ... the key for Alternate Index 'vvvvv'. The problem is...
ERROR: ... that the key (or portion of key) for the Alternate Index...
ERROR: ... is in the same key sequence order as the key for the Record...
ERROR: .. You may use the entire Record key as PART OF or ALL OF...
ERROR: ... the Alternate Index key, but not in the same key sequence order.
rrrr is the long name of the Record that has one or more Views. vvvv is the long name of the View. It is illogical for an Alternate Index to contain the whole Primary key of the main Record in the 'user' portion. Use the Record Design tool to modify the View definition.

m030vw0005 f:
RULE: AN Alternate Index's user fields MUST belong to the SAME Data Table.
ERROR: ... VIEW 'vvvv' contains user fields that are...
ERROR: ...   attributes of different data tables.
vvvv is the long name of the View. Use the Record Design tool to modify the View definition.

VIEW ERRORS (2000-3999)

These messages may be preceded by a set of messages that identify corrupt data. Those messages also identify which phase of Analyze detected the problem.

m030vw2001 f:
ERROR: A RC_ASSOC_VIEW NODE MUST have an associated subord node.
This may happen if there is insufficient memory to allocate the subodinate structure. If a memory allocation failed then try to reduce the number of tools that are loaded and then attempt to re-run Analyze.

m030vw2002 f:
ERROR: VW SEQUENCE node has NULL subord pointer.

This may happen if there is insufficient memory to allocate the subodinate structure. If a memory allocation failed then try to reduce the number of tools that are loaded and then attempt to re-run Analyze.

m030vw2003 f:
ERROR: VW SEQUENCE node has NO associated data.
This may happen if there is insufficient memory to allocate the data structure. If a memory allocation failed then try to reduce the number of tools that are loaded and then attempt to re-run Analyze.

m030vw2004 f:
ERROR: Every VW SEQUENCE node must have an associated SEQ_FIELD node.
The sequence of fields that comprise the View is corrupt. Use the Record Design tool to modify the View.

m030vw2005 f:
ERROR: Alternate Index [VIEW] 'vvvv' is not deployed in the ...
ERROR: ... System hierarchy superior to the current PROCESS.
ERROR: This Alternate Index needs to be UPDATED.
ERROR: The File associated with this Alternate Index should be ...
ERROR: ... added to the System hierarchy.
ERROR: Please make the necessary connections in the System hierarchy...
ERROR: ... NO code will be generated until this is done.
vvvv is the long name of the VIEW. The File containing the Alternate Index cannot be selected for update because it is not in the SCC hierarchy. Code cannot be generated until this File is made available.Use the SCC tool to update the SCC chart accordingly.

m030vw2006 f:
ERROR: Alternate Index 'vvvv' is NOT valid for UPDATE...
ERROR: ... but this PROCESS updates the Record, so...
ERROR: ... it must update ALL ALTERNATE INDICES.
ERROR: Therefore, you must validate the Alternate Index...
ERROR: SEE any other messages you may have gotton...
ERROR: ... concerning this Alternate Index.
vvvv is the long name of the View.

VIEW WARNINGS (4000-5999)

m030vw4001 w:
WARNING: A File SEARCH is required for Record 'rrrr'.

WARNING: You may want to consider building an Alternate Index... or VALIDATE an existing one.
  rrr is the long name of the Record.

The constraints on the given Record are such that Analyze cannot find an eligible Alternate Index to access the access the data in an efficient way. Review any warning messages for warnings concerning any existing Alternate Indexes. If no eligible Alternate Index exists then it may be advisable to build an Alternate Index for the given Record or modify the constraints. The sections outlined here detail the rules that are built into Analyze, and enable one skilled in the art to reproduce them.

VIEW INFORMATIONAL MESSAGES (6000-7999)

The informational messages below will not prevent Analyze from generating code. However, the SE should consider whether or not they indicate a potential problem.

m030vw6001 i:
**The FOREIGN KEY constraint chain for Record 'rrrr'...... contains complex constraints.
At this time, these constraints will not be...... set up in the Alternate Index Record.**
rrrr is the long name of the Record. The constraints for the given Record are complex i.e. they contain a mixture of logical AND and OR operators. The existing code within Analyze is not capable of extracting the constraints that are pertinent to the Alternate Index analysis for the given Record. Check that Analyze has selected the correct Alternate Index, if there is one.

m030vw6002 i:
**The OTHER constraint chain for Record 'rrrr' ...... contains complex constraints.
At this time, these constraints will not be...... set up in the Alternate Index Record.**
rrrr is the long name of the Record. The 'OTHER' constraints refer to non-PK, non-FK constraints for the given Record. The constraints for the given Record are complex (i.e. they contain a mixture of logical AND and OR operators). The existing code within Analyze is not capable of extracting the constraints that are pertinent to the Alternate Index analysis for the given Record. Check that Analyze has selected the correct Alternate Index, if there is one.

GRAPHIC INFORMATION MODELING AND ICON-BASED INTERMEDIATE TEXT LANGUAGE GENERATION

APPENDIX II

BNF DEFINITION GRAMMAR

BNF DEFINITION

<access-mode> ::=
 {
   GU (get unique)
  | GHU (get and enque)
  | GUSP (get and hold position)
  | GN (get next)
  | ISRT (insert)
  | REPL (replace)
  | DLET (delete)
  | DEQ (release enque)
  | GUSP_END (end of GUSP)
  | OPIN (open for input)
  | OPOT (open for output)
  | OPIO (open for input and output)
  | OPAP (open for output and append to existing file)
  | CLOS (close file)
  | READ (Read file)
  | WRIT (write file)
 }

<action-mode> ::=
 {
  BEG-ACT
   [<op-code>...<op-code>]
  END-ACT
 }

<action-operator> ::=
 {
  + (addition - arithmetic fields only)
  | - (subtraction - arithmetic fields only)
  | / (division - arithmetic fields only)
  | * (multiplication - arithmetic fields only)
  | ** (exponentiation - arithmetic fields only)
  | || (concatenation - string fields only)
 }

<base-specification> ::=
 {
  BASED <element-pointer>
  | BASED ADDR <element-char>
  | BASED ADDR <element-numeric>
 }

<cast-as> ::=
 {
  [ CHAR
   | NUM
  ]

}

<comparator> ::=
    {
            EQ (equal)
        | NE (not equal)
        | GT (greater than)
        | NG (not greater than)
        | GE (greater than or equal to)
        | LT (less than)
        | NL (not less than)
        | LE (less than or equal to)
    }

<conjuncture> ::=
    {
            AND
        | OR
    }

<create-area> ::=
    {
        CR user-created-work-variable
        [<base-specification>]
        create-data-type
        create-data-length
        create-decimal-positions
        create-sign-indicator
        create-edit-keyword
        create-init-value
        create-init-value-type
    }

<create-subroutine> ::=
    {
        SR system-created-subroutine
            [<op-code>...<op-code>]
        END
    }

<do-specification> ::=
    {
        DO <do-specify-clause> [<dowhile-specification>]
            [<op-code>...<op-code>]
        END
    }

<do-specify-clause> ::=
    {
        <element-numeric>
        DO-ASGN <do-parameters>

```
        TO <do-parameters>
        [STEP-BY <do-parameters>]
}

NOTE: If a STEP-BY option is not specified then a default of "STEP-BY +1" will always be as-
        sumed.

<do-parameters >        ::=
    {
        <element-numeric>
        | numeric-literal-value
    }

<dowhile-specification > ::=
    {
        WH <expression-comparative> [<conjuncture><expression-comparative>]
    }

<derive-specification >  ::=
    {
        DERIVE |
        <ruleset-specification>
    }

<element-char >::=
    {
        CHAR <element-name>
    }

<element-name >        ::=
    {
        user-created-work-variable
        | INCA DE
        | INCA DT->DE
        | INCA IO->DT->DE
        | INCA RC
        | INCA RC->DE [<subscript>...<subscript>]
        | INCA SC
        | INCA SC->DE [<subscript>...<subscript>]
        | INCA ST
        | INCA ST->DE
        | INCA TN
        | INCA TN->DE [<subscript>...<subscript>]
    }

NOTE: Each element must have valid data characteristics.

<element-numeric >     ::=
    {
        ZONE <element-name>
        | PACK <element-name>
```

```
        | BIN <element-name>
}

<element-pointer>    ::=
{
        PTR <element-name>
}

<expression-action>    ::=
{
        <rhs> <action-operator> <rhs>
}

<expression-comparative>    ::=
{
        <rhs><cast-as> <comparator> <rhs>
}

<file-access>    ::=
{
        FL file-name
        <access-mode>
        [RC record-name]
        [<relational-operator>]
        [<expression-comparative>[<conjuncture><expression-comparative>]]
}

<function-call> ::=
{
        CALL system-created-subroutine
        | CALL <function-spec-secondary>
}

<function-spec-primary>    ::=
{
        FN function-name (invokes system specified module)
        | Current-Date
        | SCF-Date
        | Current-Time
        | Low-Values
        | High-Values
        | Size-Of <rhs>
        | TCCR-Ptr
        | EIB-Ptr
        | SubString <rhs> <rhs> <rhs>
        | Address-Of <rhs>
        | Screen-Attributes
        | initial-default-values
        | command-line
        | command-line-function
}
```

```
<function-spec-secondary>     ::=
    {
        FN function-name (invokes system or user specified module)
        ST structure-name
    }

<if-specification>     ::=
    {
        If <if-clause>
        THEN
            [<op-code>...<op-code>]
        [ELSE
            [<op-code>...<op-code>]
        ]
        END
    }

<if-clause>     ::=
    {
        <expression-comparative> [<conjuncture><if-clause>]
    }

<lhs>     ::=
    {
        <element-name>
        | <function-spec-primary>
    }

<macro-specification>     ::=
    {
        [1STPARM <statement>]
        [CONTPARM <statement>...<statement>]
        LASTPARM <statement>
        RULESET [<op-code>...<op-code>]
    }

<module-online>     ::=
    {
        [<create-area>...<create-area>]
        <action-mode>[<action-mode>...<action-mode>]
        [<create-subroutine>...<create-subroutine>]
    }

<module-batch>     ::=
    {
        [<create-area>...<create-area>]
        [<op-code>...<op-code>]
        <action-mode>[<action-mode>...<action-mode>]
        [<op-code>...<op-code>]
        [<create-subroutine>...<create-subroutine>]
    }
```

```
<op-code>      ::=
    {
        [<statement>
        | <if-specification>
        | <do-specification>
        | <select-specification>
        | <create-area>
        | <function-call>
        | <derive-specification>
        | EXIT-PROGRAM <rhs>
        | EXIT-ROUTINE
        | ERROR-ROLLBACK '1'
        | <create-subroutine>
        | <verify>
        | <ruleset-specification>
        | I/O <file-access>
        | EXT-READ <file-access>
        | EXT-WRIT <file-access>
        | FMT-WRIT <file-access>
        | SQL <file-access>
        ]
    }
```

NOTE: The DERIVES and RULESETS are ways for users to tag and/or group user code. This is necessary for for reapplying the code after a regeneration.

```
<parenthesis-indicator> ::=
    {
        LPAREN (left parenthesis)
        | RPAREN (right parenthesis)
    }

<process>      ::=
    {
        DISP <module-online> REFR <module-online> PROC <module-online>
        | DISP <module-online> REFR&PROC <module-online>
        | MFUPDT <module-batch>
        | EXT <module-batch> FMT <module-batch>
    }

<relational-operator>  ::=
    {
        FA_EQ (equal)
        | FA_GE (greater than or equal)
        | FA_GT (greater than)
    }

<rhs>          ::=
    {
        LPAREN <rhs-action> RPAREN
        | <rhs-action>
```

```
}

<rhs-action>   ::=
    {
        <element-name>
        | <function-spec-primary>
        | <expression-action>
        | literal-value
    }

<ruleset-specification>   ::=
    {
        RULESET [<op-code>...<op-code>]
        | macro-specification
    }

<select-specification>   ::=
    {
        SE <rhs>
            [<select-when-clause>...<select-when-clause>]
            <select-otherwise-clause>
        END
    }

<select-otherwise-clause>   ::=
    {
        OT
            [<op-code>...<op-code>]
        END
    }

<select-when-clause>   ::=
    {
        WH literal-value
            [<op-code>...<op-code>]
        END
    }

<statement>   ::=
    {
        <lhs><cast-as> ASGN <rhs>
        | error-msg
        | info-msg
        | comment
        | cmd_line_act_mode ASGN <rhs>
        | cmd_line_bus_func ASGN <rhs>
        | cmd_line_parms    ASGN <rhs>
    }

<subscript>   ::=
    {
```

```
            SUB <element-numeric>
            | SUB numeric-literal-value
    }

<verify>      ::=
    {
        VER <element-name>
    }
```

BNF SYMBOL DEFINITIONS and GLOSSARY OF TERMS

BNF SYMBOL DEFINITIONS

|  |  |
|---|---|
| ::= | - is defined as |
| no brackets | - REQUIRED |
| \| | - OR (i.e., must choose one - A \| B) |
| [] | - OPTIONAL |
| <name>...<name> | ITERATION not recursion |

BNF TERMS error-msg - A message to be displayed in the error line of the screen upon module completion.
element-name - An instance key on the relational data base that decomposed to an instance of a data element.
literal-value - Any alphanumeric and/or special character.
numeric-literal-value - Any "numeric" value only.

BNF - Bachaus Normal Form is the elementary or normalized definition of any language.

Insertion Point - The position where rules are placed in the generated code. Rules cannot be automatically placed in generated code unless the point of insertion has been defined.

ITL - Intermediate Text Language is the generic code generated by Inca. All Iconic rules are written to the Inca data bases as ITL. The ITL is translated to the target language on the mainframe.

BNF EXPANSION

<action-mode-dcl>   ::=
    {
            literal-value ',' literal-value ';'
    }

<data-type>   ::=
    {
            CHAR
        | BIN
        | ZONED
        | PACK
    }

<declare>   ::=
    {
            <declare> <create-area>
        | <declare> <structure-dcl>
        | <declare> <record-dcl>
    }

<edit-keyword> ::=
    {
            ALPHA
        | ALPHABLK
        | ALPHNUM
        | ALPHNUMB
        | ALPHNUMN
        | ALPHNUMS
        | ALPHSPCL
        | ALPHSPNB
        | CAPS
        | DATELT
        | DATELTEQ
        | DATEV
        | DATESLSH
        | DATEYYYY
        | JULIAN
        | MOD10
        | MOD11
        | OFFON
        | TABLEVER
        | UNDEFNED
        | YESNO
        | YYMMDD
        | ZNNS
        | ZNS
        | ZNSWDP
        | ZNT
        | ZNWDP

```
        }

<orientation>    ::=
    {
            HORIZONTAL
          | VERTICAL
    }

<pf-dcl>         ::=
    {
            literal-value
    }

<program>        ::=
    {
            PROGRAM IDENTIFIER [<declare>] <screen-init> <process> END
    }

<record-dcl>     ::=
    {
            CREATE RECORD IDENTIFIER <struct-component>..<struct-component> END
    }

<screen-attribute>   ::=
    {
            SET_CURSOR
          | HIGHLIGHT
          | ERR_MAP
          | PROTECT_VIS
          | PROTECT_INVIS
          | UNPROTECT
    }

<screen-fld-dcl>     ::=
    {
            FLD IDENTIFIER
                LENGTH LPAREN literal-value RPAREN
                [BASE LPAREN literal-value , literal-value RPAREN]
                [OCCURS LPAREN literal-value RPAREN <orientation>
                    OFFSET LPAREN literal-value , literal-value RPAREN]
                [HELP LPAREN literal-value RPAREN]
          | LBL literal-value
                [BASE LPAREN literal-value , literal-value RPAREN]
                [OCCURS LPAREN literal-value RPAREN <orientation>
                    OFFSET LPAREN literal-value , literal-value RPAREN]
          | GROUP IDENTIFIER
                [BASE LPAREN literal-value , literal-value RPAREN]
                [OCCURS LPAREN literal-value RPAREN <orientation>
                    OFFSET LPAREN literal-value , literal-value RPAREN]
                <screen-fld-dcl> .. <screen-fld-dcl>
                END
```

```
        }

<screen-init>   ::=
    {
            SCREEN IDENTIFIER
                ACTION_MODES <action-mode-dcl> .. <action-mode-dcl> END
                KEY_AREA <screen-fld-dcl>..<screen-fld-dcl> END
                DATA_AREA <screen-fld-dcl>..<screen-fld-dcl> END
                PFKEYS [<pf-dcl>..<pf-dcl>] END
    }

<sign-indicator >       ::=
    {
            SIGNED
        |   UNSIGNED
    }

<struct-component >   ::=
    {
            GROUP OCCURS LPAREN literal-value RPAREN
                                <struct-component>..<struct-component> END
        |   <type-spec> [INIT literal-value]
    }

<structure-dcl > ::=
    {
            STRUCTURE IDENTIFIER <struct-component>..<struct-component> END
    }

<type-spec >    ::=
    {
            IDENTIFIER <data-type> literal-value literal-value
                    <sign-indicator> <edit-keyword>
    }
```

I claim:

1. Apparatus for developing software to operate a processor-based system which includes a plurality of cooperatively operative subsystem elements, comprising:

computing means, having at least one terminal, for enabling users to input data to said computing means;

icon-based language apparatus which displays icon representations of said subsystem elements for manipulation by said users on said terminal, for enabling said users to input data defining interrelationships of said plurality of subsystem elements that comprise said processor-based system;

data modeling apparatus for enabling said users to input data defining a set of logical attributes of said subsystem elements, said set of logical attributes independent of a physical implementation of said subsystem elements such that said data modeling apparatus provides a data-centered representation of said software; and processing model apparatus, responsive to said data input by said users, for translating said defined interrelationships of said subsystem elements and said set of logical attributes of said subsystem elements into a set of statements in an intermediate text non-source code language, incapable of being directly used to operate a processor, representative of said software required to operate said processor-based system.

2. The apparatus of claim 1 wherein said icon-based language apparatus converts said data input by said users to definitions of complex relationships between subsystem elements represented by said icons.

3. The apparatus of claim 1 wherein said icon-based language apparatus comprises:

interactive editor for detecting errors entered into said input data by said users; and apparatus, responsive to said detected errors, for displaying an indication of said detected errors to said users.

4. The apparatus of claim 3 wherein said icon-based language apparatus further comprises:

program confirming apparatus for disabling said processing model apparatus in response to input data representative of an abnormally ending program entered by said users.

5. The apparatus of claim 1 wherein said icon-based language apparatus comprises:

apparatus for defining relationships between data entities.

6. The apparatus of claim 1 wherein said icon-based language apparatus comprises:

apparatus for defining relationships between elements taken from the class of data entities including: files, record, screens, reports.

7. The apparatus of claim 1 wherein said data defining interrelationships comprise data that defines entity-relationship interrelationships among said plurality of subsystem elements using a set of predefined construction rules.

8. The apparatus of claim 1 wherein said data modeling tool apparatus further comprises:

apparatus for receiving data input by said users defining a set of physical attributes of said subsystem elements; and apparatus, responsive to receipt of said physical attribute defining data, for automatically corresponding said set of logical attribute data with said set of physical attribute data.

9. The apparatus of claim 8 further comprising:

apparatus for converting said set of statements into a set of program instructions to implement said software.

10. The apparatus of claim 9 wherein said intermediate text non-source code language comprises a language having context free grammar.

11. The apparatus of claim 9 wherein said intermediate text non-source code language comprises a language using Backus-Naur form notation.

12. The apparatus of claim 1 further comprising:

apparatus for converting said set of statements produced by said processing model apparatus into a set of program instructions in a predetermined computer language.

13. A method for developing software to operate a processor-based system which includes a plurality of cooperatively operative subsystem elements, using at least one computing apparatus, having at least one terminal, for enabling users to input data to said computing apparatus, comprising the steps of:

inputting data using an icon-based language which displays icon representations of said subsystem elements for manipulation by said users on said terminal to define interrelationships of said plurality of subsystem elements that comprise said processor-based system;

inputting data using a data modeling apparatus to define a set of logical attributes of said subsystem elements, said set of logical attributes independent of a physical implementation of said subsystem elements such that said data modeling apparatus provides a data-centered representation of said software; and translating said defined interrelationships of said subsystem elements and said set of logical attributes of said subsystem elements into a set of statements using an intermediate text non-source code language, incapable of being directly used to operate a processor, representative of said software required to operate said processor-based system.

14. The method of claim 13 wherein said icon-based language converts said data input by said users to definitions of complex relationships between subsystem elements represented by said icons.

15. The method of claim 13 wherein said icon-based language detects errors entered into said input data by said users and displays, in response to said detected errors, an indication of said detected errors to said users.

16. The method of claim 15 wherein said icon-based language disables said step of translating in response to input data representative of an abnormally ending program entered by said users.

17. The method of claim 13 wherein said icon-based language defines relationships between data entities.

18. The method of claim 13 wherein said icon-based language defines relationships between elements taken from the class of data entities including: files, record, screens, reports.

19. The method of claim 13 wherein said data defining interrelationships comprise data that defines entity-relationship interrelationships among said plurality of subsystem elements using a set of predefined construction rules.

20. The method of claim 13 wherein said data modeling tool apparatus receives data input by said users defining a set of physical attributes of said subsystem elements and automatically corresponds said set of logical attribute data with said set of physical attribute data.

21. The method of claim 20 further comprising:
   converting said statements into a set of program instructions to implement said software.

22. The method of claim 13 wherein said intermediate text non-source code language comprises a language having context free grammar.

23. The method of claim 22 wherein said step of translating further comprises:
   converting said set of statements into a set of program instructions in a predetermined computer language.

24. The method of claim 13 wherein said intermediate text non-source code language comprises a language using Backus-Naur form notation.

* * * * *